United States Patent
Lundin et al.

(10) Patent No.: US 9,728,097 B2
(45) Date of Patent: Aug. 8, 2017

(54) WIRELESS COMMUNICATION BETWEEN PHYSICAL FIGURES TO EVIDENCE REAL-WORLD ACTIVITY AND FACILITATE DEVELOPMENT IN REAL AND VIRTUAL SPACES

(71) Applicant: IntellAffect, Inc., San Francisco, CA (US)

(72) Inventors: John A. Lundin, San Francisco, CA (US); Daniel Westfall, San Francisco, CA (US)

(73) Assignee: INTELLIFECT INCORPORATED, San Francisco, CA (US)

( * ) Notice: Subject to any disclaimer, the term of this patent is extended or adjusted under 35 U.S.C. 154(b) by 228 days.

(21) Appl. No.: 14/462,830

(22) Filed: Aug. 19, 2014

(65) Prior Publication Data
US 2016/0055672 A1   Feb. 25, 2016

(51) Int. Cl.
| | |
|---|---|
| G08C 19/22 | (2006.01) |
| G09B 5/02 | (2006.01) |
| A63F 13/235 | (2014.01) |
| G06Q 10/06 | (2012.01) |
| H04Q 9/00 | (2006.01) |
| A63F 13/212 | (2014.01) |
| G09B 5/14 | (2006.01) |
| A63F 13/65 | (2014.01) |
| A63F 13/30 | (2014.01) |

(52) U.S. Cl.
CPC .............. *G09B 5/02* (2013.01); *A63F 13/212* (2014.09); *A63F 13/235* (2014.09); *A63F 13/30* (2014.09); *A63F 13/65* (2014.09); *G06Q 10/06311* (2013.01); *G09B 5/14* (2013.01); *H04Q 9/00* (2013.01); *H04Q 2209/40* (2013.01)

(58) Field of Classification Search
None
See application file for complete search history.

(56) References Cited

U.S. PATENT DOCUMENTS

| | | |
|---|---|---|
| 4,075,782 A | 2/1978 | Neuschatz |
| 5,312,287 A | 5/1994 | Chuang |
| 6,193,577 B1 | 2/2001 | Kaplan |
| 6,213,872 B1 | 4/2001 | Harada et al. |
| 7,244,124 B1 | 7/2007 | Merrill |

(Continued)

*Primary Examiner* — Curtis King
*Assistant Examiner* — Chico A Foxx
(74) *Attorney, Agent, or Firm* — Muncy, Geissler, Olds & Lowe, P.C.

(57) ABSTRACT

The disclosure generally relates to physical figures having wireless communication devices implanted therein to capture evidence relating to real-world activities that may be required to progress in real-world and/or virtual spaces. For example, the wireless communication devices implanted in the physical figures may confirm proximity to other users and capture evidence indicating that progress has been achieved in real-world missions that may involve teamwork, competition, outdoor activities, and/or other real-world interaction. In one embodiment, the physical figures may have one or more sensors (e.g., accelerometers, gyroscopes, etc.) that can measure activities performed with the physical figures such that the wireless communication devices implanted therein may exchange the sensor measurements in relation to the cooperative and/or competitive interaction therebetween.

15 Claims, 8 Drawing Sheets

(56) References Cited

U.S. PATENT DOCUMENTS

| | | | |
|---|---|---|---|
| 7,568,963 B1* | 8/2009 | Atsmon | A63H 3/28 446/175 |
| 7,663,648 B1 | 2/2010 | Saldanha et al. | |
| 7,946,919 B2 | 5/2011 | Piccionelli | |
| 8,137,151 B2* | 3/2012 | Kenney | A63F 3/00028 446/330 |
| 8,401,912 B2 | 3/2013 | Ganz et al. | |
| 8,469,766 B2* | 6/2013 | Zheng | A63H 3/28 446/175 |
| 8,675,017 B2* | 3/2014 | Rose | A63F 13/00 345/633 |
| 8,790,180 B2* | 7/2014 | Barney | A63F 13/08 463/39 |
| 8,795,072 B2* | 8/2014 | Borst | A63F 13/10 463/30 |
| 8,926,395 B2* | 1/2015 | Zheng | A63H 11/00 446/268 |
| 8,990,715 B1 | 3/2015 | Harp et al. | |
| 8,996,429 B1 | 3/2015 | Francis, Jr. et al. | |
| 2003/0044758 A1 | 3/2003 | Ray | |
| 2004/0161732 A1 | 8/2004 | Stump et al. | |
| 2005/0215171 A1 | 9/2005 | Oonaka | |
| 2005/0278643 A1 | 12/2005 | Ukai et al. | |
| 2006/0223637 A1* | 10/2006 | Rosenberg | A63F 13/10 463/47 |
| 2007/0018390 A1* | 1/2007 | Sumner | A63F 3/00028 273/243 |
| 2007/0073436 A1 | 3/2007 | Sham | |
| 2007/0207698 A1 | 9/2007 | Stanley | |
| 2007/0239479 A1 | 10/2007 | Arrasvuori et al. | |
| 2008/0139080 A1 | 6/2008 | Zheng | |
| 2008/0147502 A1 | 6/2008 | Baker | |
| 2008/0287033 A1 | 11/2008 | Steinberg | |
| 2009/0053970 A1 | 2/2009 | Borge | |
| 2009/0081923 A1* | 3/2009 | Dooley | A63F 9/143 446/456 |
| 2009/0100351 A1 | 4/2009 | Bromenshenkel et al. | |
| 2009/0124165 A1 | 5/2009 | Weston | |
| 2009/0137323 A1* | 5/2009 | Fiegener | A63H 3/28 463/43 |
| 2009/0158210 A1* | 6/2009 | Cheng | G06Q 30/0224 715/810 |
| 2009/0221374 A1* | 9/2009 | Yen | A63F 13/06 463/42 |
| 2009/0234919 A1 | 9/2009 | Jefremov et al. | |
| 2010/0069148 A1 | 3/2010 | Cargill | |
| 2010/0093434 A1 | 4/2010 | Rivas | |
| 2010/0125028 A1 | 5/2010 | Heppert | |
| 2010/0172287 A1* | 7/2010 | Krieter | H04W 8/005 370/328 |
| 2010/0274902 A1* | 10/2010 | Penman | A63F 13/28 709/227 |
| 2011/0014842 A1 | 1/2011 | Rappaport-Rowan | |
| 2011/0021109 A1 | 1/2011 | Le et al. | |
| 2011/0028219 A1 | 2/2011 | Heatherly et al. | |
| 2011/0190047 A1 | 8/2011 | Ganz | |
| 2011/0213197 A1 | 9/2011 | Robertson et al. | |
| 2011/0230114 A1 | 9/2011 | Du Preez et al. | |
| 2011/0234756 A1* | 9/2011 | Adler | G06T 5/002 348/46 |
| 2011/0269365 A1 | 11/2011 | Goff et al. | |
| 2011/0312418 A1 | 12/2011 | Page | |
| 2012/0040763 A1 | 2/2012 | Auterio et al. | |
| 2012/0094767 A1 | 4/2012 | Presgraves | |
| 2012/0142429 A1 | 6/2012 | Muller | |
| 2012/0221418 A1 | 8/2012 | Smith | |
| 2012/0271143 A1* | 10/2012 | Aragones | G09B 19/0038 600/407 |
| 2013/0150155 A1* | 6/2013 | Barney | A63F 13/02 463/29 |
| 2013/0165234 A1 | 6/2013 | Hall et al. | |
| 2013/0238392 A1 | 9/2013 | Sloan et al. | |
| 2013/0309641 A1 | 11/2013 | Sawyer et al. | |
| 2014/0227676 A1* | 8/2014 | Noshadi | G09B 5/02 434/365 |
| 2015/0004584 A1* | 1/2015 | Galibois | G09B 23/30 434/270 |
| 2015/0077234 A1* | 3/2015 | Fullam | H05K 1/18 340/407.1 |
| 2015/0080121 A1* | 3/2015 | Garlington | A63H 30/04 463/31 |
| 2015/0336016 A1* | 11/2015 | Chaturvedi | A63H 30/04 446/484 |
| 2015/0375134 A1* | 12/2015 | Zhang | A63H 33/26 446/484 |
| 2016/0067593 A1* | 3/2016 | Yim | A63F 3/00643 463/31 |
| 2016/0140867 A1* | 5/2016 | Aragones | G06F 19/3481 434/257 |
| 2016/0325180 A1* | 11/2016 | Nelson | A63F 13/355 |

* cited by examiner

WIRELESS COMMUNICATION BETWEEN PHYSICAL FIGURES TO EVIDENCE REAL-WORLD ACTIVITY AND FACILITATE DEVELOPMENT IN REAL AND VIRTUAL SPACES

CROSS-REFERENCE TO RELATED APPLICATIONS

The present application is related to U.S. patent application Ser. No. 13/725,390, entitled "ENHANCED SYSTEM AND METHOD FOR PROVIDING A VIRTUAL SPACE," filed Dec. 21, 2012, which issued as U.S. Pat. No. 9,304,652 on Apr. 5, 2016, U.S. patent application Ser. No. 13/912,983, entitled "SYSTEM AND METHOD FOR PRESENTING USER PROGRESS ON PHYSICAL FIGURES," filed Jun. 7, 2013, and U.S. patent application Ser. No. 14/300,217, entitled "SYSTEM AND METHOD FOR PRESENTING USER PROGRESS ON PHYSICAL FIGURES," filed Jun. 9, 2014, which are each hereby expressly incorporated by reference in their entirety.

TECHNICAL FIELD

The disclosure generally relates to physical figures having wireless communication devices implanted therein such that wireless communication among the physical figures may evidence real-world activities conducted in physical spaces and/or virtual spaces.

BACKGROUND

In general, a virtual space may comprise a simulated space (e.g., a virtual reality) instanced on a computing device, such as a server, desktop computer, laptop computer, handheld device, or another suitable device. Furthermore, the virtual space may have one or more characters that are associated with and controlled by one or more users (e.g., via avatars that live in the virtual space), and in certain the virtual space characters may be presented on client computers to reflect development in the virtual space or other suitable ongoing real-time user interaction. For example, a physical appearance associated with the virtual space characters can have certain aspects presented on client computers in a manner that may represent progress or development in the virtual space (e.g., age, facial features, skin color or skin abnormalities, posture, clothing, armor, accessories, or other costumes, etc.). Further still, recent trends in technology have increasingly blurred the lines between virtual spaces and the real-world. For example, augmented reality (AR) generally refers to technology that combines live direct or indirect views corresponding to physical, real-world environments with computer-generated sensory input (e.g., sound, video, graphics, location data, etc.) in order to create an augmented (or supplemented) reality that has both real-world aspects and virtual reality aspects.

In that context, certain virtual space characters can have real-world analogues present information indicating user progress in the virtual space and thereby encourage users to advance in the virtual space and/or facilitate user growth through development in the real-world. However, although various existing systems support tracking real-world activities through wireless communication (e.g., augmented reality scavenger hunts), the existing systems tend to fall short in relation to the manner in which the real-world activities are tracked. For example, to the extent that existing systems may employ wireless technology to share identifying information, location, status, or current activity among wireless devices in order to detect nearby people or electronic devices, existing systems lack the flexibility to use wireless technology to capture evidence relating to real-world activities that may be conducted in contexts that have real-world and virtual aspects.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

According to one exemplary aspect, the disclosure generally relates to physical figures having wireless communication devices implanted therein such that wireless communication among the physical figures may evidence real-world activities conducted in physical spaces and/or virtual spaces in order to progress in the virtual space and/or develop in the real-world. For example, in one embodiment, the wireless communication devices implanted in the physical figures can capture evidence relating to real-world activities that may occur in contexts that relate to games, educational activities, entertainment systems, and/or other tasks in a real and/or virtual space. In general, the physical figures may include, without limitation, action figure toys, robots, dolls, mannequins, automata, and/or any other physical figures that may suitably present information indicating user progress in the virtual space. For example, the user progress in the virtual space may be represented according to graphical art (2D or 3D), still images, video, audio, animation, text, and/or any other suitable character representation information, wherein the physical figures may have different parts that can present the user progress information and thereby encourage users to develop in the virtual space and/or the real-world.

According to one exemplary aspect, the wireless communication devices implanted in the physical figures may capture evidence relating to real-world activities that may be required to progress in the real-world and/or virtual space contexts. For example, a user may be required to meet up with multiple teammates to accomplish a particular goal (e.g., organizing a scavenger hunt), whereby the wireless communication devices implanted in the physical figures may confirm proximity to fellow team members and further confirm information such as time and team category (e.g., Alpha team), team mission progress (e.g., objects obtained in the scavenger hunt), and tasks remaining to be completed. As such, the information captured using the implanted wireless communication devices may provide evidence that progress has been achieved in the real-world team missions that require teamwork, outdoor activity, and/or other real-world interaction. Furthermore, in one embodiment, the information captured with the wireless communication devices implanted in the physical figures may be saved under an account associated with the user (e.g., on a server, in local storage, etc.) such that the information can be subsequently used, posted online, categorized, printed, or otherwise perused.

According to another exemplary aspect, the wireless communication devices implanted in the physical figures may enable wireless communication between and among different users to aid in accomplishing real-world tasks. For example, different users may have physical figures that can communicate wirelessly in order to coordinate activities (e.g., scheduling a meeting with another user), engage in competition, and/or interact socially. In that context, the implanted wireless devices may communicate information about the user and/or an avatar profile associated with the user, which may specify abilities, strengths, weaknesses, powers, etc. that can be used in virtual combat situations or other competitive and/or cooperative activities in which physical figures that come into actual proximity can engage in virtual, wireless interaction where the users may try to help or hinder progression and growth in the virtual space depending on whether the activities are competitive or cooperative. Further still, in one embodiment, the physical figures may include accelerometers, gyroscopes, or other suitable sensors that can measure activity status, activity levels, physical activity types, etc., wherein the physical figures may wirelessly transmit and receive the sensor information in relation to the interaction therebetween. For example, the activity status may indicate whether there are other current active users in geographic proximity, and if so, information about the activities that the other current active users are conducting (e.g., running up stairs, walking, doing jumping jacks, etc.) such that the user may choose to participate in the activities as well (e.g., in a competitive manner where all users that participate in the activity progress in the virtual space to at least some degree and the winner progresses the most, receives a bonus, etc.).

According to another exemplary aspect, a physical figure embodying at least the above-mentioned concepts may comprise a torso piece having at least a head, arms, and legs connected thereto, a wireless communication device configured to capture evidence confirming that a user has performed a real-world activity that includes at least wireless communication with a second physical figure having wireless communication capabilities (e.g., a cooperative activity or a competitive activity that has relates to social, physical, learning, and/or other experiences that require or otherwise involve wireless interaction with the second physical figure). Furthermore, the physical figure may include a processing unit configured to transmit the captured evidence to a computing platform over a wired link and/or a wireless link using the wireless communication device, wherein the processing unit may be configured to determine real-world development associated with the user based at least in part on the evidence captured with the wireless communication device. For example, in one embodiment, the captured evidence may confirm that the user performed the real-world activity based on the wireless communication with the second physical figure confirming proximity between the first and second physical figures. Furthermore, in one embodiment, the wireless communication device associated with the physical figure may comprise a location data receiver configured to determine a location associated with the physical figure, wherein the captured evidence may confirm that the user performed the real-world activity based on the determined location, and the physical figure may further have one or more internal sensors and/or an interface to wirelessly communicate with one or more external sensors, wherein the internal and/or external sensors may be configured to measure motion that further confirms that the user has performed real-world physical activity. For example, in one use case, the wireless communication device in the physical figure may detect the second physical figure in proximity thereto, and the processing unit may then generate an objective to perform the real-world physical activity in response to determining that the second physical figure was used to perform the real-world physical activity. Further still, according to other exemplary aspects, the processing unit may be further configured to receive character representation information that indicates the real-world development associated with the user and progress in a virtual space, and the physical figure may include one or more display screens configured to present the character representation information that indicates the real-world development and the progress in the virtual space.

According to another exemplary aspect, a method for capturing evidence that relates to real-world activities according to the above-mentioned concepts may comprise, among other things, establishing a wireless connection at a physical figure having a torso piece and at least a head, arms, and legs connected to the torso piece, monitoring the wireless connection to capture evidence confirming that a user has performed a real-world activity using the physical figure, and transmitting the captured evidence to a computing platform configured to determine real-world development associated with the user based at least in part on the evidence captured over the monitored wireless connection. For example, in one embodiment, the method may comprise confirming that the user performed the real-world activity based on the captured evidence including wireless communication with another proximally located physical figure and/or based on a location that can be determined using a location data receiver implanted in the physical figure. Furthermore, in one embodiment, the method may comprise obtaining one or more motion measurements confirming that the user has performed real-world physical activity using one or more internal sensors implanted in the physical figure and/or one or more external sensors that communicate with the physical figure over the wireless connection, wherein certain use cases may further comprise detecting another proximally located physical figure via the wireless connection and generating an objective to perform the real-world physical activity based on the other physical figure having been used to perform the real-world physical activity.

Other objects and advantages associated with the various aspects and/or embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
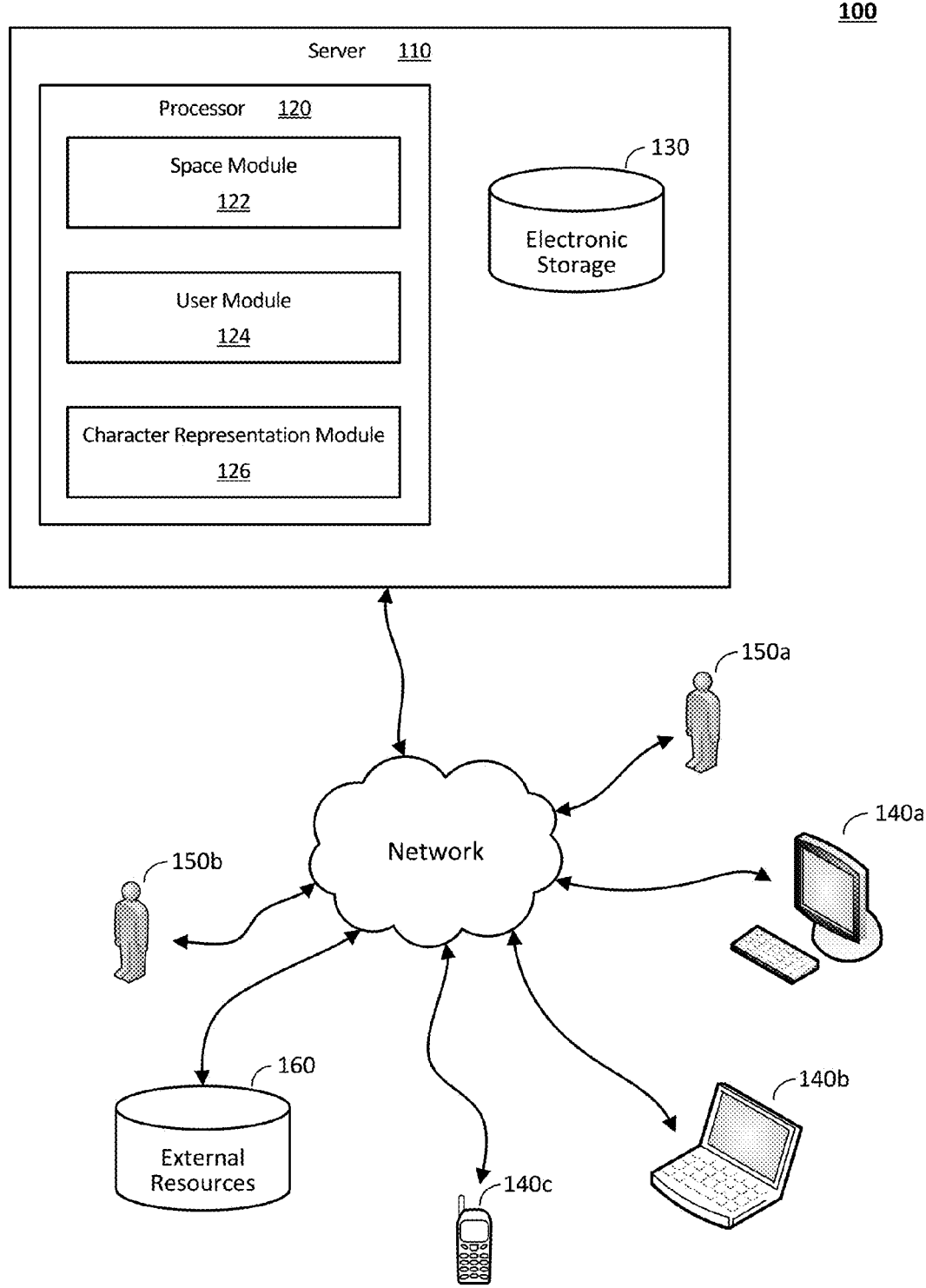
FIG. 1 illustrates an exemplary system in which one or more physical figures may have wireless communication devices implanted therein that can capture evidence relating to real-world activities, according to one exemplary aspect.

According to one exemplary aspect, FIG. 1 illustrates an exemplary system 100 in which one or more physical figures 150a, 150b, etc. may have wireless communication interfaces that can capture evidence relating to real-world activities that may be conducted in real and/or virtual spaces in order to progress in the virtual space and/or develop in the real-world. For example, in one embodiment, each physical figure 150 may have a wireless communication device implanted therein, wherein the implanted wireless communication device can be used to capture evidence relating to real-world activities that may occur in contexts that relate to games, educational activities, entertainment systems, and/or other tasks in a real and/or virtual space. In general, the physical figures 150a, 150b, etc. may include, without limitation, action figure toys, robots, dolls, mannequins, automata, and/or any other physical figures that may suitably present information indicating user progress in the virtual space. For example, the user progress in the virtual space may be represented according to graphical art (2D or 3D), still images, video, audio, animation, text, and/or any other suitable character representation information, wherein the physical figures 150 may have different parts that can present the user progress information and thereby encourage users to develop in the virtual space and/or the real-world.

In one embodiment, as will be described in further detail below, the wireless communication devices implanted in the physical figures 150 may capture evidence relating to real-world activities that may be required to progress in the real-world and/or virtual space contexts. For example, a user may be required to meet up with multiple teammates to accomplish a particular goal (e.g., organizing a scavenger hunt), whereby the wireless communication devices implanted in the physical figures 150 may confirm proximity to fellow team members and further confirm information such as time and team category (e.g., Alpha team), team mission progress (e.g., objects obtained in the scavenger hunt), and tasks remaining to be completed. As such, the information captured using the implanted wireless communication devices may provide evidence that progress has been achieved in the real-world team missions that require teamwork, outdoor activity, and/or other real-world interaction. Furthermore, in one embodiment, the information captured with the wireless communication devices implanted in the physical figures 150 may be saved under an account associated with the user (e.g., on a server 110, in local storage, etc.) such that the information can be subsequently used, posted online (e.g., on a social media website), categorized (e.g., to create leaderboard rankings), printed, or otherwise perused.

Furthermore, in one embodiment, the wireless communication devices implanted in the physical figures 150 may enable wireless communication between and among different users to aid in accomplishing real-world tasks. For example, different users may have physical figures 150 that can communicate wirelessly in order to coordinate activities (e.g., scheduling a meeting with another user), engage in competition, and/or interact socially. In that context, the implanted wireless devices may communicate information about the user and/or an avatar profile associated with the user, which may specify abilities, strengths, weaknesses, powers, etc. that can be used in virtual combat situations or other competitive and/or cooperative activities in which physical figures 150 that come into actual proximity can engage in virtual, wireless interaction where the users may try to help or hinder progression and growth in the virtual space depending on whether the activities are competitive or cooperative. Further still, in one embodiment, the physical figures 150 may include one or more internal accelerometers, gyroscopes, or other suitable sensors and/or communicate with one or more external sensors that can measure activity status, activity levels, physical activity types, etc. (e.g., data relating to user movement, positioning, heart rates, or other suitable health or activity variables). In either case, individual and/or different physical figures 150 may wirelessly transmit and receive the internal and/or external sensor information in relation to interaction associated therewith (e.g., the internal and/or external sensors may measure the activities that individual users perform and the implanted wireless devices may exchange information relating to the measured activities with physical figures 150 associated with other users). For example, in one use case, the activity status may indicate whether there are other current active users in geographic proximity, and if so, information about the activities that the other current active users are conducting (e.g., running up stairs, walking, doing jumping jacks, etc.) such that the user may choose to participate in the activities as well (e.g., in a competitive manner where all users that participate in the activity progress in the virtual space to at least some degree and the winner progresses the most, receives a bonus, etc.).

In one embodiment, the system 100 shown in FIG. 1 may include a server 110 configured to communicate with one or more client computing platforms 140a, 140b, 140c, etc. according to a client/server architecture, wherein users may access the system 100 and/or a virtual space via the client computing platforms 140. Furthermore, the server 110 may be configured to execute one or more computer program modules, which may include a space module 122, a user module 124, a character representation module 126, and/or other suitable modules, wherein the server 110 may execute the character representation module 126 to determine character representation information that can then be transmitted to and presented on the physical figures 150.

In one embodiment, the space module 122 may implement a virtual space instance that reflects the state associated with a particular virtual space, wherein the virtual space instance may be used to push state information to implement on the client computing platforms 140, verify state information generated on the client computing platforms 140 executing local expressions that correspond to the virtual space instance, and/or otherwise used on the client computing platforms 140. For example, in one embodiment, the state information may indicate, without limitation, position information associated with one or more objects, topography information, object status/shape information, battle information, score information, user or character progress information, user inventory information, progress information associated with one or more activities or actions, view information describing the virtual space, and/or other information that describes the state associated with the virtual space. Furthermore, the local expressions that correspond to the virtual space instance executed on the client computing platforms 140 may facilitate presenting views that correspond to the virtual space instance on the client computing platforms 140 (e.g., via streaming the view information, the object/position information, and/or other state information received from the space module 122). The local expressions may further include space logic that effectively allows a client computing platform 140 to execute a limited version corresponding to the virtual space instance, which may be synchronized and/or verified with state information received from the space module 122. Further still, the view presented on a given client computing platform 140 may correspond to a location in the virtual space (e.g., the location that the view depicts or from which the view is taken), a zoom ratio, object dimensions, a point-of-view, and/or selectable view parameters.

In one embodiment, the virtual space instance may comprise a simulated space that users can access via the client computing platforms 140, which may present views corresponding to the virtual space to the users. For example, the simulated space may have a topography, express ongoing real-time user interaction, and/or include one or more objects that are positioned and movable within the topography. In certain instances, the topography may be a two-dimensional topography and/or a three-dimensional topography, which may include dimensions associated with the virtual space and/or features associated with a surface or object "native" to the virtual space, surfaces that run through the virtual space (e.g., a ground surface), a volume with one or more bodies positioned therein (e.g., a gravity-deprived space simulation having one or more celestial bodies positioned therein), and so on. Furthermore, the virtual space instance may be synchronous, asynchronous, and/or semi-synchronous in various embodiments. Those skilled in the art will appreciate that description provided above relating to the possible virtual space views that the space module 122 may determine are not intended to be limiting, whereby the virtual space may be presented in a more limited manner or a richer manner. For example, the virtual space views may be selected from generic graphics depicting an event in a particular place within the virtual space and/or additional content beyond the generic graphics to provide more detail about the current state associated with the virtual space (e.g., text, audio, pre-stored video content, etc.). For example, in one embodiment, a virtual space view may include a generic battle graphic with a text describing the opponents to be confronted.

In one embodiment, users may initiate actions in the virtual space to participate in the virtual space instance, wherein the client computing platforms 140 may provide physical controls to enable the actions (e.g., play buttons, joysticks, motion sensors, cameras, keyboards, mice, and/or other suitable physical controls). Furthermore, in certain use cases, a graphical user interface (GUI) implemented on the client computing platforms 140 may provide the controls to enable the actions (e.g., graphics, menus, dialog boxes, forms, sliding bars, buttons, radio boxes, tabs, etc.). In any case, the user may provide inputs to initiate virtual space maneuvers, participate in virtual activities, or otherwise engage in interactions within the virtual space. For example, a user may provide an input that specifies how many troops to march to a virtual space location that the user has been tasked with defending. Accordingly, commands corresponding to the user-initiated actions may be generated and executed in the virtual space (e.g., via the space module 122) in order to effectuate the user-initiated interactions within the virtual space and thereby produce changes to the virtual space state that may reflect user progress in the virtual space and/or results or consequences from the user-initiated actions.

In one embodiment, within the virtual space instance, the space module 122 may implement one or more rules, which may limit the actions and/or interactions that the user may initiate while participating in the virtual space, enforce certain actions and/or interactions, describe an order or orders in which the actions and/or interactions should be taken, or otherwise establish or enforce appropriately defined regulations that control the virtual space. For example, the virtual space rules may establish relationships among users on the same team and/or among different teams, which may allow users (or teams) to form alliances, role classes, races, countries, states, provinces, research orders, religions, characters, military forces, upgrade orders, trade terms, treaty terms, loans, mission eligibility criteria, quests, campaigns, and/or otherwise engage with other virtual space entities and/or components provided in the virtual space. In certain use cases, the virtual space rules may be predetermined at an initial configuration stage, evolve dynamically as the virtual space progresses, or any suitable combination thereof. Furthermore, in certain use cases, one or more users may program individual variant or otherwise customized virtual space rules that can then be incorporated into the virtual space rules.

In one embodiment, within the virtual space instance, the users may be provided with one or more objectives to interact within the virtual space, wherein a service provider, administrator, moderator, parent, and/or other suitable entity may define the objectives according to virtual space states, levels, points, milestones, and/or other activities that the users should try to achieve through actions within the virtual space and/or interactions with other virtual space entities. Furthermore, in one embodiment, the virtual space objectives may include sub-objectives that can be completed to further achieving an overarching objective, and in certain use cases, users may specify objectives that may be assigned to other users (e.g., to cooperate and/or compete with the user that specified the objectives in attempting to complete certain activities, missions, quests, campaigns, etc.). Further still, within the virtual space, real-world objectives may be provided to users, wherein the real-world objectives may be designed to help the users develop physical abilities, knowledge, skills, social relationships, emotional maturity, health, and/or any other real-world areas that may relate to personal well-being in the real-world. For instance, a user may be provided with a real-world objective to plant a tree, develop a social relationship, learn a skill, acquire knowledge, perform a physical activity, etc.

In one embodiment, to motivate, encourage, and/or recognize user achievements in the virtual space (e.g., completing certain virtual space and/or real-world objectives), the users may receive rewards to progress within the virtual space upon completing the objectives. For example, the rewards may affect the state associated with the virtual space (e.g., unlocking one or more items, improving one or more abilities, acquiring one or more new skills, awarding virtual currencies, etc.) and thereby give the rewarded user new abilities and/or actions that can be used to interact with the virtual space and/or other users in ways that were not available to the user prior to the reward. Furthermore, in one example, the rewards may be ascetic and decorative awards such as medals, badges, body armor, outfits, tattoos, shoulder pads, shoes, and/or any other accessories given to the user to recognize achievements in the virtual space and/or in the real-world. For instance, a first badge or award may be given to the user upon completing a difficult quest in the virtual space, and a second badge or award may be given to the user upon completing the quest in a record time or multiple quests having a particular theme (e.g., helping the environment).

In one embodiment, users may control characters, objects, simulated physical phenomena (e.g., wind, rain, earthquakes, etc.), and/or other elements within the virtual space to interact with the virtual space and/or other users. For example, the characters may include user characters and non-user characters. Accordingly, as used herein, the term "user character" may refer to an object (or multiple objects) present in the virtual space to represent an individual user that controls the user character associated therewith. On the other hand, the term "non-user character" as used herein may not be associated with any user in the virtual space (e.g., controlled using artificial intelligence). In various use cases, the user characters may move through and interact with other elements in the virtual space (e.g., non-user characters, other virtual space objects and/or the topography) and users may initiate maneuvers to move the user characters in the virtual space. In addition, the users may create and/or customize user characters associated therewith.

In one embodiment, within the virtual space instance, user characters may develop improvements and/or losses in skills, knowledge, abilities, powers, personalities, physical appearances, intelligence, poses, accessories, and/or other characteristics, wherein the user character development may be achieved through the users interacting with the virtual space. For example, a user character may develop (e.g., through virtual space rewards) when the user achieves a particular goal, objective, virtual space level, experience points, score, skill, and/or other virtual space milestone through the user character. In certain use cases, the user character may develop simply because the user collected one or more gratuitous rewards. In any case, the service provider, administrator, moderator, parent, and/or other entities related to the virtual space may pre-plan the user character development at a configuration stage (e.g., specifying how many other users a user character will have an ability to connect with after having gained one-hundred experience points in the virtual space, and further specifying that the ability to interact with other users will increase a certain amount when the user gains another one-hundred experience points, etc.). Alternatively (or additionally), the user character development may be determined at runtime or according to other dynamic criteria. Although the foregoing passages describe user character development that result in progressing in the virtual space, in certain use cases, the user character development may result in lost skills and/or abilities in the virtual space (e.g., the user character may lose a protection skill when the user character has a very low experience level). In any case, the user character development may affect the ability that the user character has to change the state associated with the virtual space. For example, as the user character gains new skills, gains new abilities, or otherwise develops in the virtual space, the user character may be able to interact with other users, non-user characters, virtual space objects, and/or other virtual space elements in ways that were not available to the user character prior to the development. For instance, a user character may establish friendship with five other user characters when the user character gains a new social skill in the virtual space. In another example, a user might unlock the ability to go on a team quest with other compatible users.

In one embodiment, the virtual space instance may further facilitate interactions between and among the users, wherein the facilitated interaction may include collaboration, group activities, competitions, and/or other social interactions between and among the users. For example, the users, service providers, administrators, moderators, parents, and/or any other entities may establish teams within the virtual space, wherein members on the same team may coordinate actions, assist one another, divide goals and/or objectives, rely upon collective abilities, skills, knowledge, resources, and/or other user characteristics, and/or otherwise engage in collaborative actions in the virtual space and/or the real-world (e.g., to achieve objectives provided in the virtual space). Accordingly, teams may compete against each other to achieve an objective provided in the virtual space (e.g., a virtual space objective and/or real-world objective) and each team may have rules and/or shared agendas that team members agree to follow.

In one embodiment, the user module 124 may generally access and/or manage one or more user profiles and/or user information associated with users in the system 100. The user profiles and/or user information may include information stored on the server 110, one or more client computing platforms 140, and/or other storage locations. For example, the user profiles may include information indicating user progress in the virtual space and/or in the real-world, information identifying users within the virtual space (e.g., user names or handles, numbers, identifiers, etc.), security information (e.g., a password or other authentication credentials), virtual space account information, subscription information, virtual currency account information (e.g., related to currency held in credit), relationship information (e.g., relationships among users in the virtual space and/or the real-world), virtual space usage information, demographic information, interaction history among users in the virtual space, user-stated information, purchase information, browsing histories, a client computing platform identification (e.g., a phone number associated with a user), etc.

In one embodiment, the progress information about individual users that the user module 124 manages may indicate and/or quantify advancements and/or development in the virtual space and/or the real-world. For example, the progress information may indicate user advancements towards an overarching objective in the virtual space and/or the real-world (e.g., sub-objectives that have been completed and remaining sub-objectives to be completed, a completion percentage corresponding to in-progress objectives, missions, quests, campaign, scenarios, points, levels, or scores that have been gained in the virtual space, etc.). Furthermore, the progress information may indicate specific skills, abilities, clues, virtual items, and/or other suitable virtual space elements that the user has acquired in the virtual space, and in certain use cases, the progress information may indicate user development in the real-world (e.g., physical activities, real-world skills, knowledge, social relationships, emotional experiences, and/or other real-world experiences).

In one embodiment, evidence may be used to track progress that individual users have made within the virtual space, wherein the evidence may include location information, position information, velocity information, orientation information, battery information, and/or any other information regarding the physical figure 150, which may have one or more wireless communication devices, receivers, sensors, detectors, and/or other suitable devices implanted therein to acquire the evidence information. For example, the implanted wireless communication devices may support wireless technologies that allow the physical figures 150 to form direct peer-to-peer connections (e.g., a near-me area network (NAN) that may be formed among wireless devices in close proximity, a wireless personal area network (WPAN) that may interconnect devices within several meters from one another or several kilometers from a central server that can facilitate the interconnection, a wireless local area network (WLAN) that allows Wi-Fi devices to form direct connections without a wireless access point provided that at least one device supports Wi-Fi Direct, a direct cellular connection between two or more devices that support LTE-Direct, etc.). As such, the wireless communication devices implanted in the physical figures 150 may confirm proximity to other users and provide evidence that progress has been achieved in real-world activities that may further progress in the virtual space. Furthermore, because different wireless communication devices may have different ranges, the proximity required to capture the evidence may vary from one use case to another depending on the particular wireless technology therein (e.g., Bluetooth generally supports wireless communication over short distances, usually around ten meters or less, while Wi-Fi Direct generally allows device-to-device connectivity within approximately 100 meters or less, and LTE-Direct has a range up to approximately 500 meters). Further still, in a physical figure 150 that has more than one wireless communication device implanted therein, the evidence captured therewith may vary due to the varying ranges that the wireless technologies support (e.g., different activities may be appropriate depending on whether the users are a few hundred meters apart, in which case only an LTE-Direct device may detect the proximity, versus users that are standing very close to one another, which may be the case when a Bluetooth device detects another device in proximity thereto).

In one embodiment, the evidence used to track the progress that individual users have made within the virtual space may further include media such as still images, video, audio, scanned information, and/or any other media indicating the progress that individual users have made. For example, a user may capture media through a portable device that may be incorporated into the physical figure 150 (e.g., a camera). In any case, the evidence that the physical figures 150 capture may be transmitted to the server 110 (e.g., directly via the wireless communication device, via a client computing platform 140, etc.), which may then process and store the evidence information. For example, the evidence may processed to identify objects, scenes, activities, and/or any other subject matter that the user completed in the real-world, extract and determine various preset parameters to analyze user progress in the real-world, categorize the captured evidence (e.g., associating the evidence with tags, textual description or database fields, etc.), and store the evidence in association with individual user accounts. Furthermore, in one embodiment, the progress information about individual users may be divided into different categories to distinguish user advancements in different areas within the virtual space and/or within the real-world. For examples, social points may be tabulated for user real-world experiences in social relationships, physical points may be tabulated for user real-world experiences in physical activities, learning points may be tabulated for user real-world experiences in learning skills, knowledge, abilities, and so on.

In one embodiment, the character representation module 126 may be configured to determine character representation information to present on the physical figures 150 associated with individual users based on the user progress information managed by the user module 124. For example, the determined character representation information may include information that facilitates presenting various aspects of user progress in the virtual space on a physical figure 150 associated with the user. For example, the character representation information may include information regarding graphical art, still images, movies, animations, audio, text, and/or other character representation information. In one example, the determined character representation information may be presented on the physical figure 150 associated with the user, in which case the character representation information may be the rendered graphical art, still image, movie, animation, audio, and/or the text, which may be streamed or otherwise transmitted to the physical figure 150. In another example, the character representation information may include instructions, model information, path information, and/or other information to facilitate rendering the graphical art, still image, movie, animation, audio, and/or text on the physical figure 150.

In one embodiment, the server 110, client computing platforms 140, and/or external resources 160 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 110, client computing platforms 140, and/or external resources 160 may be operatively linked via some other communication media.

In one embodiment, a given client computing platform 140 may include one or more processors configured to execute computer program modules. The computer program modules may be configured to enable an expert or user associated with the given client computing platform 140 to interface with system 100 and/or external resources 160, and/or provide other functionality attributed herein to client computing platforms 140. By way of non-limiting example, the given client computing platform 140 may include one or more of a desktop computer, a laptop computer, a handheld computer, a tablet computing platform, a NetBook, a Smartphone, a gaming console, and/or other computing platforms.

In one embodiment, the physical figures 150 may comprise a torso piece having a head, arms, and legs connected thereto. For example, the physical figures 150 may include, without limitation, dolls, mannequins, action figure toys, robots, automata, and/or other suitable physical figures that can be used to capture evidence relating to real-world activities and thereby indicate progress in a virtual space. The physical figure 150 may comprise one or more processing units configured to receive character representation information indicating user progress in the virtual space, which may be received from the server 110 over a wireless network connection (e.g., via the wireless communication device implanted therein). Likewise, the wireless communication device implanted in the physical figure 150 may be used to connect to a client computing platform 140 via any suitable wireless connection (e.g., an 802.11x Wi-Fi connection, a Wireless Universal System Bus (USB) connection, a radio frequency (RF) connection, a near field communication (NFC) connection, a Bluetooth connection, an infrared connection, a ZigBee connection, etc.). Furthermore, the physical figure 150 may have one or more display screens that may attached to the physical figure 150 and used to present character representation information that indicate different aspects associated with the user progress in the virtual space. For example, one or more display screens may be attached to the head piece to display experience points and/or any other virtual space score that the user earned, to the torso piece to display armor, outfit, wardrobe, clothing and/or other torso elements representing achievement in one or more social relationships, to arm pieces to display arm sleeve, shoulder pad, arm tattoo and/or other arm elements representing learning achievements, to leg pieces to display pants, shoes, leg tattoo, and/or other leg elements representing an more physical activity achievement, etc. Furthermore, in one embodiment, the physical figure 150 may comprise speakers to present audio character representation information.

In one embodiment, the physical figure 150 may comprise one or more media capture units configured to capture media evidence, which may include still images, video, audio, scanned information, location information, and/or any other type(s) of capture media. As such, the media capture units that may be included in the physical figure 150 may include cameras, voice recorders, scanners, and/or any media capture device(s). For example, without limitation, the physical figure 150 may comprise a camera that may be used to take pictures and/or video corresponding to real-world landmarks, scenes, objects, activities, and/or any other type(s) real-world subject matter engaged by the user. In another example, the physical figure 150 may comprise an audio recorder that may be used by the user to record audio clips of real-world sounds and/or speeches. In still another example, the physical figure 150 may comprise a scanner configured to scan real-word information such as words or images from a real-world or digital source, which may include bar codes, numerical or alphabetical codes, text books, magazines, printed material, real-world or digital art, people, and/or any other sources with meaning within a context that corresponds to a game, therapeutic and/or educational activity, and/or other activities.

In one embodiment, as noted above, the physical figure 150 may have a wireless communication device implanted therein, wherein the wireless communication device may comprise a location data receiver (e.g., GPS, Loran C, cellular, radio, optical, Infrared, and/or other suitable location data receivers), and the physical figure 150 may further include one or more internal sensors and/or the ability to wirelessly communicate with one or more external sensors (e.g., a gyroscope, accelerometer, speedometer, temperature sensor, etc.). As such, the implanted wireless communication device and/or the sensors (whether internal or external) may be used to determine a location associated with the physical figure 150 at a given time. For instance, in one embodiment, the wireless communication device may acquire one or more GPS signals or other suitable signals that can be used to compute a position, which may then be advanced using subsequent measurements obtained with the one or more sensors (e.g., according to dead reckoning techniques) and/or further signals acquired at the wireless communication device. The wireless communication devices and sensors implanted in the physical figures 150 may therefore capture evidence relating to real-world activities that may be required to progress in the real-world and/or virtual space contexts, which may involve confirming proximity to other users, real-world places or objects, or other things in the real-time world that pertain to objectives to be completed in order to progress in the virtual space.

Furthermore, the physical figures 150 may use the implanted wireless communication device to transmit the evidence captured with the wireless communication device and/or the sensors to a client computing platform 140, another physical figure 150, and/or the server 110, which may then further process the captured evidence. For instance, a user may be prompted in the virtual space described herein to run a one-hundred yard dash in the real-world, in which case the internal and/or external sensors may be used to confirm that the user ran the appropriate distance and to further calculate one or more metrics associated therewith (e.g., how fast the user completed the dash). In other examples, the implanted wireless communication devices may enable wireless communication between and among different users to aid in accomplishing real-world tasks, wherein physical figures 150 associated with different users may communicate wirelessly to coordinate activities, engage in competition, and/or interact socially. For example, the implanted wireless communication devices may include various network communication capabilities, which may include full phone capabilities, capabilities to send text messages, multimedia messages, or application-specific messages, and/or any suitable combination thereof. In that context, the implanted wireless devices may communicate information about the user and/or an avatar profile associated with the user, which may specify abilities, strengths, weaknesses, powers, etc. that can be used in virtual combat situations or other competitive and/or cooperative activities in which physical figures 150 that come into actual proximity can engage in virtual, wireless interaction where the users may try to help or hinder progression and growth in the virtual space depending on whether the activities are competitive or cooperative. In one embodiment, transmitting the captured evidence to the client computing platform 140, another physical figure 150, and/or the server 110 may be effectuated in response to the physical figure 150 capturing the evidence using the wireless communication device, the sensors, the media capture unit, or another suitable mechanism, wherein the captured and transmitted evidence may then be stored, categorized, processed, and associated with the user.

Furthermore, in one embodiment, the client computing platforms 140 mentioned above may include one or more devices or other physical pieces that generally aggregate the functional capabilities associated with the physical figures 150. In that context, the physical figures 150 may have a physical interface that allows users to detach and/or attach the devices or other physical pieces that aggregate the functional capabilities associated therewith, or the devices or other physical pieces that aggregate the functional capabilities may include standalone objects that may communicate with the physical figures 150 over a wired or wireless link. For example, as children grow older and no longer want to carry the physical figure 150 around as a toy, the devices or other physical pieces that aggregate the functional capabilities associated therewith may be carried around instead, thereby allowing the children to continue participation in the missions that involve the real-world and/or virtual aspects disclosed herein while the physical figure 150 acts as a trophy and an interface to update progress based on the evidence that the functionality aggregating devices capture. Accordingly, the functionality aggregating devices may comprise a smartphone, tablet, or other suitable that can provide all the functional aspects associated with the physical figure 150, including at least wireless communication, media capturing, motion sensing, and visual and audio output, while having a subtler outward physical appearance that may be better suited to older children and/or adults that do not want to carry around something that appears to be a toy designed for young children.

In one embodiment, in addition to the various components mentioned above, the system may further include one or more external resources 160, which may include information sourced from hosts and/or providers associated with virtual environments external to the system 100, external entities participating with the system 100, and/or other suitable resources. In one embodiment, some or all functionality attributed herein to the external resources 160 may be provided using internal resources in the system 100.

In one embodiment, the server 110 may include electronic storage 130, one or more processors 120, and/or other components in addition to communication lines or ports to enable exchanging information with a network and/or other computing platforms. However, the server 110 illustrated in FIG. 1 is not intended to be limiting, in that the server 110 may include various hardware, software, and/or firmware components that operate together to provide the functionality attributed to the server 110. For example, the server 110 may be various computing platforms operating together in a cloud infrastructure.

Those skilled in the art will further appreciate that the above description is merely illustrated as one exemplary configuration capture evidence relating to real-world activities that further progress in a virtual space using a physical figure 150 having a wireless communication device implanted therein. As such, in certain embodiments, a localized system 100 may be configured according to a stand-alone architecture such that the system may reward a user in a virtual space based on the user performing a gesture in accordance with the disclosure. For example, a localized system 100 may comprise a processor the same as or similar to the processor 120 (e.g., a CPU, a graphical processing unit (GPU), storage, memory, an I/O subsystem, etc.), in which case the CPU may be configured to communicate virtual space state information to the GPU through any suitable wired or wireless communications such as, but not limited to, a point-to-point communication like a data bus included in the localized system 100. The GPU may be configured to determine representational view information to present virtual space instances on one or more displays coupled to or included in the localized system 100. It should also be appreciated in other embodiments, multiple localized systems 100 may be connected via any wired or wireless links according to a distributed architecture (e.g., peer to peer networks) such that the localized systems 100 may be configured to operate in concert to achieve all or some of the functions of 122, 124, 126, as described above, especially where different users interact using physical figures 150 that have wireless communication devices implanted therein.

Figure 2:
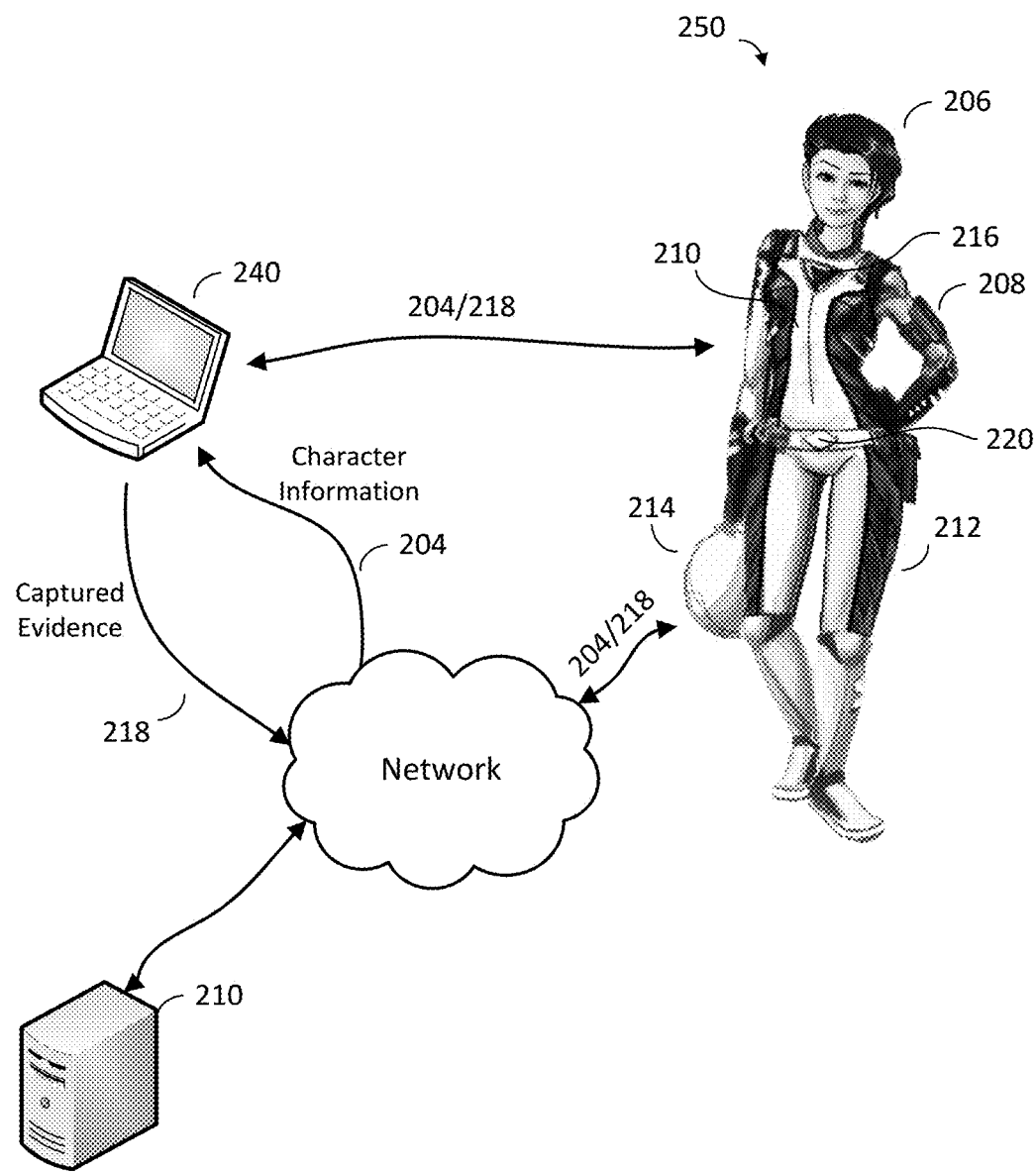
FIG. 2 illustrates an exemplary system in which a physical figure with one or more wireless communication devices implanted therein may capture evidence relating to real-world activities and present character representation information based thereon, according to one exemplary aspect.

According to one exemplary aspect, FIG. 2 illustrates an exemplary system in which a physical figure 250 may have one or more wireless communication devices implanted therein that can capture evidence relating to real-world activities and present character representation information based thereon. As shown in FIG. 2, character information 204 representing user progress in a virtual space may be determined at a server 210, which may then transmit the character information 204 over a network to a client computing platform 204 that may be connected to the physical figure 250 via any suitable point to point link that may be used to transmit the character information 204 to the physical figure 250 or otherwise synchronize the character information 204 with the physical figure 250 (e.g., a USB connection, a Bluetooth connection, an infrared connection, etc.). Furthermore, as mentioned above, the physical figure 250 may have one or more wireless communication devices 220 implanted therein, whereby the physical figure 250 may alternatively (or additionally) receive the character information 204 directly from the server 210 over any suitable wireless link that connects the implanted wireless communication device(s) 220 to the network. More particularly, in one embodiment, textual character information 204 (e.g., a game score), graphical art information (e.g., character body armor), or other suitable character information 204 may be directly transmitted from the server 210 to the physical figure 250 via the implanted wireless communication device(s) 220. Alternatively (or additionally), the character information 204 may be transmitted from the server 210 to the client computing platform 240 via any suitable wireless or wired link, and the client computing platform 240 may then communicate the character information 204 received from the server 210 to the physical figure 250 via a suitable wireless or wired link. Furthermore, in certain use cases, the wireless communication devices 220 may have network communication capabilities, which may include full phone capabilities, capabilities to send text messages, multimedia messages, or application-specific messages, and/or any suitable combination thereof. In any case, the character information 204 may be received at the physical figure 250, which then appropriately renders the character information 204 via one or more display screens 214 located on the physical figure 250.

In particular, as shown in FIG. 2, the physical figure 250 may include a helmet having an integrated display screen 214 that can render the character information 204. However, those skilled in the art will appreciate that the physical figure 250 may have various different parts that can include display screens 214 that can render the character information 204 in different context. For example, as further shown in FIG. 2, the physical figure 250 may include a head piece 206, arm pieces 208, a torso piece 210, and leg pieces 212, which may each have a respective display screen (not shown) attached thereto. Accordingly, the display screens 214 attached to the different parts on the physical figure 250 may render or otherwise present specific traits among the character information 204 received from the server 210. For example, in one embodiment, the display screen 214 attached to the helmet may be configured to present character information 204 that represents experience points and/or any other virtual space score that the user has earned in the virtual space, while a display screen attached to the torso piece 210 may present character information 204 that represents armor, outfits, wardrobe, clothing, and/or other suitable torso elements that may represent achievements in one or more social relationships associated with the user, display screens attached to the arm pieces 208 may present character information 204 that represents arm sleeves, shoulder pads, arm tattoos, and/or other suitable arm elements that may represent learning achievements, and display screens attached to the leg pieces 212 may present character information 204 that represents pants, shoes, leg tattoos, and/or other suitable leg elements that may represent physical activity achievements. However, those skilled in the art will appreciate that the above-mentioned character information 204 that may be presented on the display screens attached to the various parts on the physical figure 250 are exemplary only, and that the various display screens may be configured to represent other suitable character traits and/or user achievements in real-world and/or virtual contexts.

In one embodiment, the physical figure 250 shown in FIG. 2 may further include one or more components that can capture evidence 218 to indicate that the user has engaged in one or more real-world activities. For example, as mentioned above, the physical figure 250 may include one or more wireless communication devices 220 that can communicate with physical figures associated with other users that likewise have wireless communication capabilities (e.g., over an 802.11x Wi-Fi connection, a Wireless USB connection, a radio frequency (RF) connection, a near field communication (NFC) connection, a Bluetooth connection, an infrared connection, a ZigBee connection, an LTE-Direct or other suitable cellular connection, etc.). Furthermore, in certain use cases, the physical figure 250 may have location determination capabilities that may be used to capture the evidence 218 to indicate that the user has engaged in the real-world activities. For example, in one embodiment, the wireless communication devices 220 may comprise a location data receiver (e.g., a GPS receiver, a cellular radio, etc.) and a gyroscope, accelerometer, speedometer, temperature sensor, or other suitable sensors (not shown). Alternatively, in one embodiment, the wireless communication devices 220 may communicate with one or more external sensor devices (e.g., a Fitbit Tracker, smartwatch, or other wearable technology) that can assist in the location determination capabilities. As such, the implanted wireless communication devices 220 may acquire one or more signals that can be used to compute a position (e.g., GPS measurements), which may then be advanced using subsequent measurements obtained with the one or more sensors (e.g., according to dead reckoning techniques) and/or further signals that the implanted wireless communication devices 220 acquire. Furthermore, in certain use cases, the sensors may be configured to measure activity status, activity levels, physical activity types, etc., which the physical figure 250 may use to capture further evidence 218 relating to real-world activities conducted therewith. Further still, the physical figure 250 may include a media capture unit 216 (e.g., a camera, voice recorder, scanner, etc.) that can capture audio, video, and/or other media that may provide further evidence 218 to indicate that that the user has engaged in one or more real-world activities.

Accordingly, at least the wireless communication devices 220, the internal and/or external sensors, and the media capture unit 216 may be attached to, implanted in, or otherwise coupled to the physical figure 250 in order to capture the evidence 218 that relates to the real-world activities, wherein the evidence 218 may be required to progress in real-world and/or virtual space contexts. For example, the wireless communication devices 220 may support one or more peer-to-peer or device-to-device technologies (e.g., Bluetooth, Wi-Fi Direct, LTE-Direct, technologies such as ZigBee that are based on the IEEE 802.15 standard, etc.), whereby the wireless communication devices 220 can confirm proximity to physical figures 250 associated with other users and support wireless communication to engage in cooperative and/or competitive real-world activities. In addition, the wireless communication devices 220, the internal and/or external sensors, and media capture unit 216 may be used to capture evidence 218 that confirms proximity to real-world places or objects that pertain to objectives to be completed in order to progress in the virtual space. For example, in one use case, the wireless communication devices 220 may acquire GPS coordinates to indicate that the physical figure 250 is present in a particular location where an object to be found in a scavenger hunt can be found and the media capture 216 unit may then acquire audio, video, still images, etc. to confirm that the object was indeed found at the location. In another example, a user may be assigned an objective that requires the user to meet up with one or more teammates to accomplish a particular goal, whereby the wireless communication devices 220 implanted in the physical figures 250 associated with the various teammates may be configured to communicate over a wireless connection and thereby confirm proximity to one another, exchange profile information that can confirm whether the users are indeed teammates, confirm team mission progress, and so on. In other examples, the implanted wireless devices 220 may communicate information about the users and/or avatar profiles associated with the user, which may specify abilities, strengths, weaknesses, powers, etc. that can be used in wireless virtual combat situations or other competitive and/or cooperative activities among physical figures 250 that come into actual proximity, while the internal and/or external sensors may measure activity types, activity levels, etc. that can be wirelessly transmitted and received in relation to the competitive and/or cooperative activities. Furthermore, those skilled in the art will appreciate various other examples where wireless communication between the physical figures 250 may provide evidence 218 about real-world activities to facilitate advancement in a virtual space, as disclosed herein. For example, another non-limiting use case that involves wireless communication between the physical figures 250 may occur where different physical figures 250 make physical contact and/or come within sufficient proximity to establish a short-range connection over which information can be exchanged (e.g., an NFC connection that generally requires physical contact between NFC-enabled devices or proximity within a few centimeters). In that use case, the ability to establish the short-range connection may evidence the physical contact and/or close proximity between the physical figures 250, which may then light up or generate other outputs according to the contact and/or proximity (e.g., a "fist bump" that causes the physical figures 250 to light up red and thereby indicate excitement, which may tie into missions in the sense that social points may be awarded, a mission may include a "fist bump" task, etc.).

In one embodiment, in response to capturing suitable evidence 218 about the real-world activities using at least the wireless communication devices 220, the sensors, and the media capture unit 216, the captured evidence 218 may then be transmitted to the client computing platform 240 and/or the server 210, which may process the evidence 218 to determine user progress in the real-world and/or the virtual spaces described herein. In particular, the captured evidence 218 may be transmitted directly to the server 210 using the implanted wireless communication devices 220, or the evidence 218 may be transmitted to the client computing platform 240 via a wired or wireless link and then forwarded to the server 210. However, those skilled in the art will further appreciate that direct transmission to the server 210 may serve certain benefits with respect to ongoing real-world activities. For example, a user may be away from home or otherwise lack convenient access to the client computing platform 240. As such, the implanted wireless communication devices 220 may transmit the evidence 218 directly to the server 240 in order to indicate that a particular objective has been achieved and receive a new objective to further advance in the real-world and/or the virtual space without having to connect to the client computing platform 240. In either case, the evidence 218 that may be captured and ultimately provided to the server 210 may be saved under an account associated with the user such that the evidence 218 can be subsequently used, posted online, categorized, printed, perused, or otherwise used.

Furthermore, in one embodiment, the physical figure 250 shown in FIG. 2 may be associated with or otherwise used in a contained environment or educational setting, which may include an amusement park, a zoo, a sports stadium, or other suitable environments. Accordingly, in that context, the physical figure 250 may include venue-based branding such that users may receive the physical figure 250 at the appropriate venue and participate in venue-specific missions having social, entertainment, educational, and/or other suitable dimensions. For example, at Disney amusement parks, the physical figure 250 may have a likeness that corresponds to Mickey Mouse, Minnie Mouse, Donald Duck, Goofy, and other popular Disney characters, whereby the physical figure 250 may be taken throughout the amusement park where venue-based missions can be carried out and users may be awarded points that can then be redeemed for merchandise when the user leaves the park. In other examples, the physical figure 250 at a sports stadium may have a likeness that corresponds to popular athletes on the home team, the physical figure 250 at a zoo may have a likeness that corresponds to a zoologist, and so on, whereby the physical figure 250 may be taken throughout the contained environment where the physical figure 250 is distributed to users and users can be similarly awarded points that can then be redeemed for merchandise when the user leaves the venue. Furthermore, the wireless communication devices 220 implanted in the physical figures 250 may be used in connection with the various activities that the users perform within the contained venues. For example, a child visiting an amusement park on their birthday may be given a physical figure 250 and information indicating that today is the child's birthday may be stored thereon. Accordingly, as the child visits various attractions in the park, wireless devices located in the environment may sense the physical figure 250 and start a special birthday celebration for the child in response to picking up the birthday information stored on the sensed physical figure 250 (e.g., personal shout-outs with the child's name, special songs that incorporate the child's name, etc.), and moreover, the physical figure 250 may be light up, speak, or generate other outputs to let people in the area know whose birthday it is. In another example, during a fireworks show or another suitable group gathering at Disney amusement parks, one or more wireless signals may be programmed and transmitted to the physical figure 250, wherein the wireless signals may cause the physical figure 250 to light up or generate other suitable outputs according to a role that the specific character has in the show (e.g., any physical figures 250 that are fashioned after Tinkerbell may light up when a Tinkerbell fireworks display appears in the sky). Furthermore, a real-life Tinkerbell character could then pay a visit to the child who has the Tinkerbell version of the physical figure 250 and has accumulated the most progress in the virtual space.

Figure 3A:
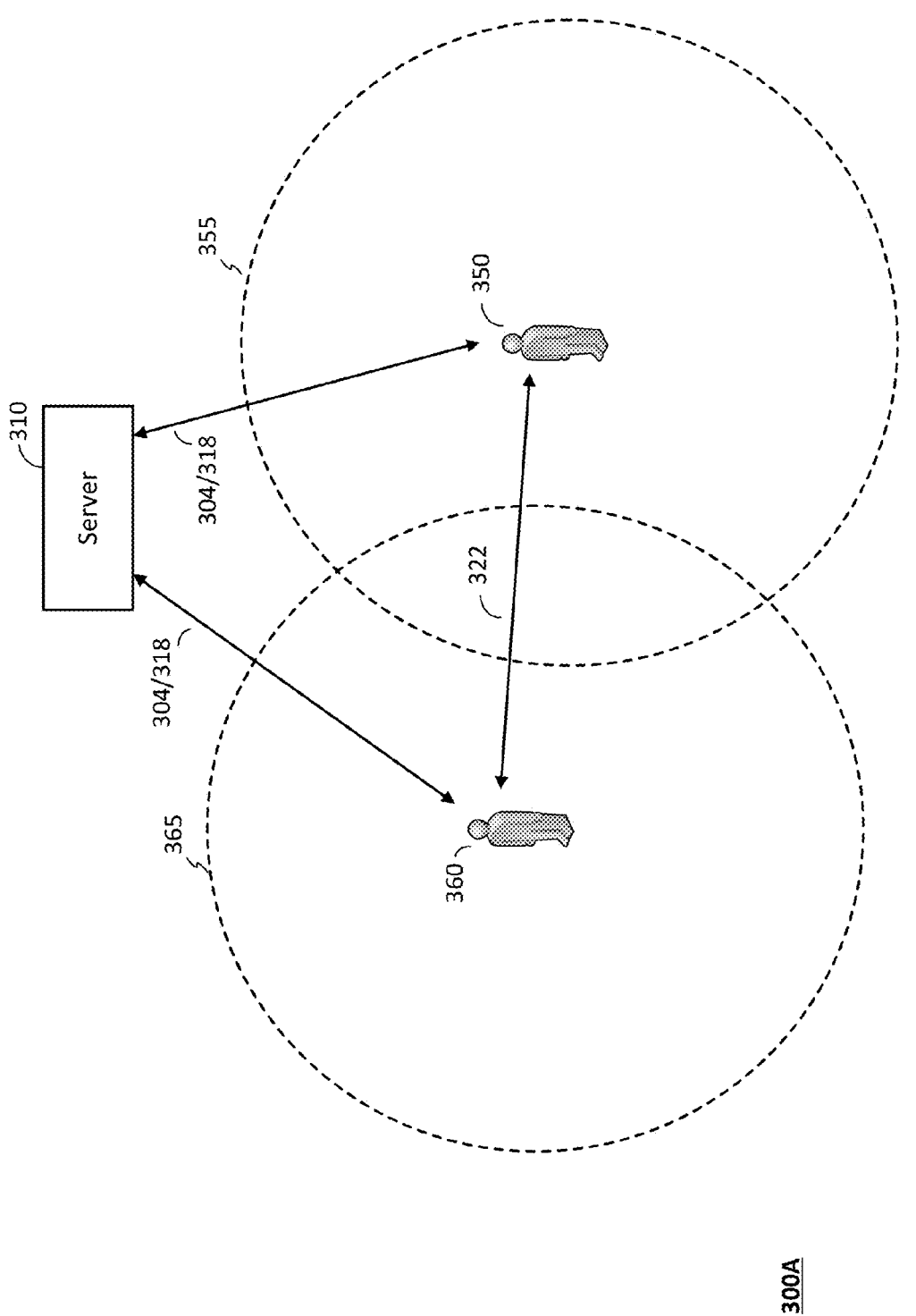
FIG. 3A and FIG. 3B illustrate exemplary systems in which physical figures having wireless communication devices implanted therein may capture evidence relating to real-world activities, according to one exemplary aspect.
Figure 3B:
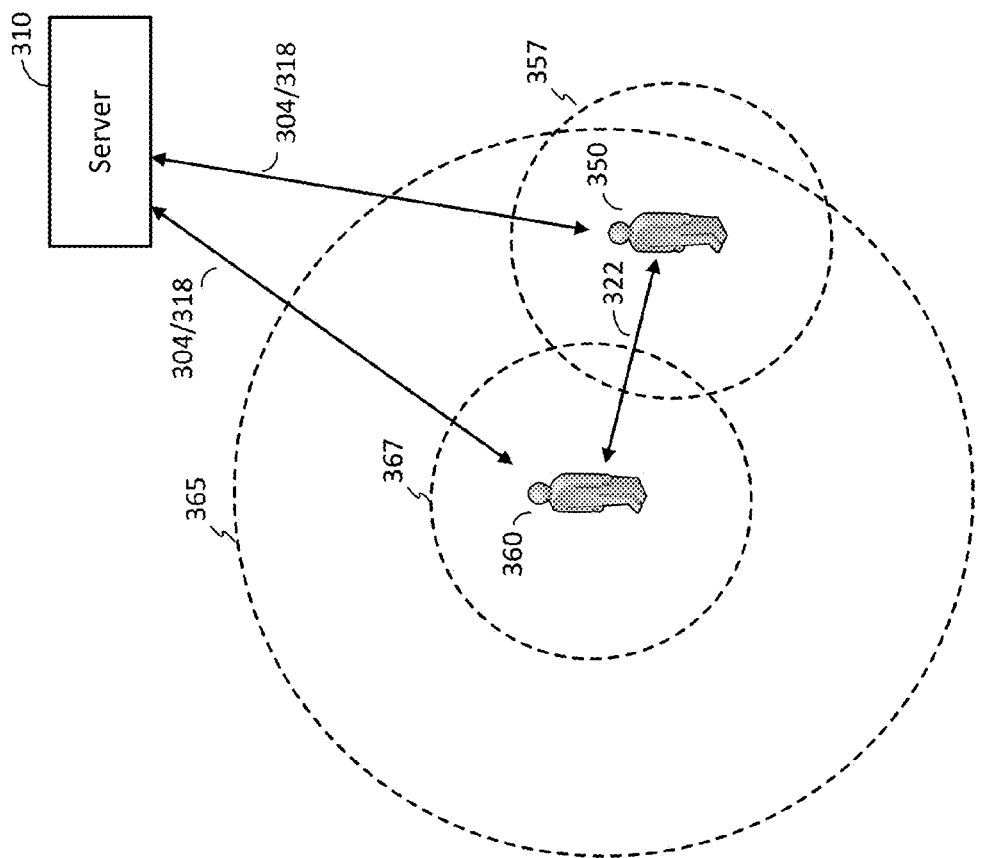

According to one exemplary aspect, FIG. 3A and FIG. 3B illustrate exemplary systems in which physical figures having wireless communication devices implanted therein may capture evidence relating to real-world activities, wherein the captured evidence may facilitate real-world development and/or development in a virtual space. More particularly, in the exemplary system 300A shown in FIG. 3A, at least a first physical figure 350 associated with a first user and a second physical figure 360 associated with a second user may each have a wireless communication device implanted therein to capture evidence relating to real-world activities that may facilitate progress in the virtual space and/or real-world development, wherein the wireless communication devices implanted in the physical figures 350, 360 can capture evidence relating to real-world activities in contexts that relate to games, educational activities, entertainment systems, and/or other tasks in a real and/or virtual space. For example, as shown in FIG. 3A, the wireless communication device implanted in the first physical figure 350 may generally support wireless communication over a particular range, which may encompass an area that corresponds to dashed circle 355, and the wireless communication device implanted in the second physical figure 360 may similarly support wireless communication over a particular range, which may encompass an area that corresponds to dashed circle 365. Accordingly, when the physical figures 350, 360 come within sufficient proximity to one another, the wireless communication ranges 355, 365 associated therewith may overlap such that the implanted wireless communication devices can communicate with one another over a suitable wireless link 322 and thereby confirm proximity to one another. Alternatively (or additionally), the wireless communication devices that are implanted in the physical figures 350, 360 may report location information associated therewith to a server 310 that can then estimate a distance between the physical figures 350, 360 and determine whether the physical figures 350, 360 are located in proximity to one another.

Accordingly, in one embodiment, the system 300A shown in FIG. 3A may operate in a context where users may be assigned objectives or other real-world activities that involve interaction between and/or among the physical figures 350, 360, wherein the wireless communication devices implanted therein may capture evidence to confirm whether the real-activities were performed. For example, the users associated with the physical figures 350, 360 may each be members on a particular team within the virtual space and the users may be assigned an objective to meet up with one another to accomplish a particular goal (e.g., completing a scavenger hunt), whereby the wireless communication devices implanted in the physical figures 350, 360 may confirm proximity to the fellow team member and further confirm information such as the time when the proximity was detected, identification information to confirm that the users are indeed members on the same team, progress towards achieving the team mission (e.g., objects obtained in the scavenger hunt), and tasks remaining to be completed. As such, the information captured using the implanted wireless communication devices may provide evidence that progress has been achieved in the real-world team missions that involve teamwork, competition, outdoor activity, social interaction, and/or other real-world activity. For example, the wireless devices implanted in the physical figures 350, 360 may communicate information about the respective users and/or avatar profiles associated with the respective users, which may specify abilities, strengths, weaknesses, powers, etc. that can be used in virtual combat situations or other competitive and/or cooperative activities among the physical figures 350, 360 that come into actual proximity. In that context, the physical figures 350, 360 can engage in virtual, wireless interaction where the users may try to help or hinder progression and growth in the virtual space depending on whether the activities are competitive or cooperative. Further still, in one embodiment, the physical figures 350, 360 may include accelerometers, gyroscopes, or other suitable sensors that can measure activity status, activity levels, physical activity types, etc., wherein the physical figures 350, 360 may wirelessly transmit and receive the sensor information in relation to the interaction therebetween. For example, the activity status may indicate whether there are other current active users in geographic proximity, and if so, information about the activities that the other current active users are conducting (e.g., running up stairs, walking, doing jumping jacks, etc.) such that the user may choose to participate in the activities as well (e.g., in a competitive manner where all participating users progress in the virtual space to at least some degree and the winner progresses the most, receives a bonus, etc.).

In one embodiment, as noted above, the wireless communication devices implanted in the physical figures 350, 360 may support wireless technologies that allow direct peer-to-peer connections. For example, the wireless communication devices may be used to form a near-me area network (NAN) among wireless devices in close proximity, a wireless personal area network (WPAN) that interconnects devices located within several meters from one another or several kilometers from a central server that can facilitate the interconnection, a wireless local area network (WLAN) that allows Wi-Fi devices to form direct connections without a wireless access point provided that at least one device supports Wi-Fi Direct, a direct cellular connection between two or more devices that support LTE-Direct, a body area network (BAN) among various wearable computing devices in immediate proximity to the physical figures 350, 360 and/or the human body, etc. As such, the wireless communication devices implanted in the physical figures 350, 360 may confirm proximity to other users and provide evidence that progress has been achieved in real-world activities that may further progress in the virtual space based on the wireless communication devices implanted therein coming within sufficient proximity to allow a wireless connection to be formed. Furthermore, because different wireless communication devices may have different ranges, the proximity evidence and/or the manner in which the proximity may be used can vary from one use case to another depending on the particular wireless technology therein. For example, Bluetooth generally supports wireless communication over short distances, usually around ten meters or less, wireless devices implementing the IEEE 802.15 standard (e.g., ZigBee modules) can generally transmit and receive over distances from ten to one-hundred meters, while Wi-Fi Direct generally allows device-to-device connectivity within approximately 100 meters or less, and LTE-Direct has a range up to approximately 500 meters.

Accordingly, as shown in FIG. 3B, a physical figure 360 that has more than one wireless communication device implanted therein may support wireless communication over various ranges. For example, the physical figure 360 may communicate wirelessly over a short distance corresponding to the area 367 using a Bluetooth radio and over a larger range corresponding to the area 365 using a Wi-Fi radio, a cellular radio, or other suitable device having a larger communication range. In that context, the evidence captured with the implanted wireless communication devices may vary according to the different ranges 365, 367. For example, when the physical figure 350 associated with another user comes within sufficient range to communicate over Bluetooth, the evidence may be used to infer close proximity between the physical figures 350, 360, which may have relevance to real-world social experiences due to the proximity that would be required to allow communication over such a short distance. In other examples, different activities may be appropriate depending on how close the users are to one another, whereby a first real-world activity that requires minimal person-to-person interaction may be assigned when the other figure 350 is within the range 365 but outside the range 367 (e.g., a virtual combat mission between the physical figures 350, 360), while a second real-world activity that requires more person-to-person interaction may be assigned when the other figure 350 is within the range 367 (e.g., an objective where each user has to report something that was learned about the other user).

Figure 4:
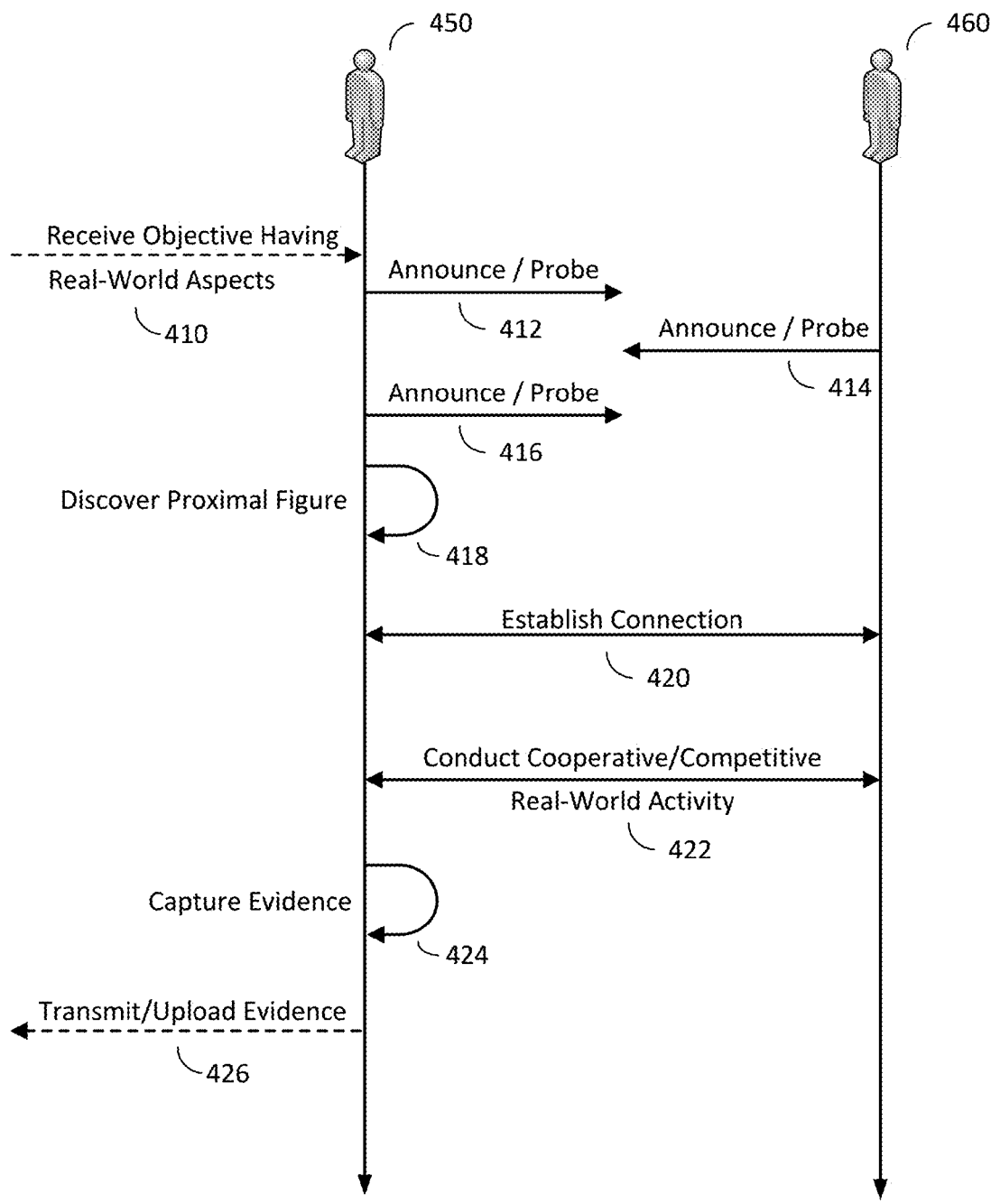
FIG. 4 illustrates an exemplary communication flow among physical figures that may capture evidence relating to real-world activities using wireless communication devices implanted in the physical figures, according to one exemplary aspect.

According to one exemplary aspect, FIG. 4 illustrates an exemplary communication flow 400 among physical figures 450, 460 that may capture evidence relating to real-world activities using wireless communication devices implanted in the physical figures. In the following description, the call flow 400 will generally be provided in relation to messages that may be received at, transmitted from, or otherwise processed at the physical figure 450. However, those skilled in the art will appreciate that such description is for simplicity only, and that the same or substantially similar messages may be received at, transmitted from, or otherwise processed at the physical figure 460.

In one embodiment, at 410, a message that specifies an objective having real-world aspects may be received at the physical figure 450, wherein the real-world aspects may generally involve at least some interaction with the physical figure 460 associated with another user. For example, the objective may relate to a social activity, a physical activity, a learning activity, or another suitable activity that involves cooperation and/or competition among different users in the real-world. However, those skilled in the art will appreciate that in certain instances, the user may independently seek out other users without having first received any predefined objective at 410. For example, users associated with the physical figures 350, 360 may be known to often congregate at certain places, whereby the physical figure 350 may be brought to those places with the expectation that objectives may be dynamically determined on arrival. In any case, at some point in time, the wireless communication device implanted in the physical figure 450 may be activated and begin a search to find other physical figures 460 with which to interact. More particularly, at 412, the physical figure 450 may transmit a message that announces presence such that another physical figure 460 can transmit a probe message at 414 and thereby detect the physical figure 450. In a similar respect, the physical figure 460 may transmit an announce message such that the physical figure 450 can detect the presence associated with the physical figure 450 after transmitting a further probe message at 416.

In one embodiment, at 418, the wireless communication device at the physical figure 450 may then discover the proximally located physical figure 460 based on the announce/probe messages that the physical figures 450, 460 previously transmitted. The physical figures 450, 460 may then establish an appropriate wireless connection at 420 and exchange any information that may be needed to conduct a cooperative and/or competitive activity at 422. Accordingly, at 424, the wireless communication device at the physical figure 450 may monitor the wireless connection that was established between the physical figures 450, 460 and the information that may be exchanged during the cooperative and/or competitive real-world activity in order to capture evidence corresponding to the real-world activity (e.g., location information, proximity information, an outcome from the real-world activity, progress towards a real-world objective, etc.).

In one embodiment, at 426, the captured evidence about the real-world activities may then be transmitted or otherwise uploaded to a client computing platform and/or a server using the wireless communication device implanted in the physical figure 450, wherein the client computing platform and/or the server may then process the evidence to determine user progress in the real-world and/or the virtual spaces described herein. In particular, the captured evidence may be transmitted directly to the server and/or the client computing platform using the implanted wireless communication devices, and in the latter case, the client computing platform may appropriately forward the evidence to the server. However, those skilled in the art will further appreciate that direct transmission to the server may serve certain benefits with respect to ongoing real-world activities, especially where transmitting the evidence directly to the server can indicate that a particular objective has been achieved and a new objective to further advance in the real-world and/or the virtual space can be received in a mobile context. In either case, the evidence that may be captured and ultimately uploaded at 426 may be saved under an account associated with the user associated with the physical figure 450 such that the evidence can be subsequently used, posted online, categorized, printed, perused, or otherwise used.

Figure 5:
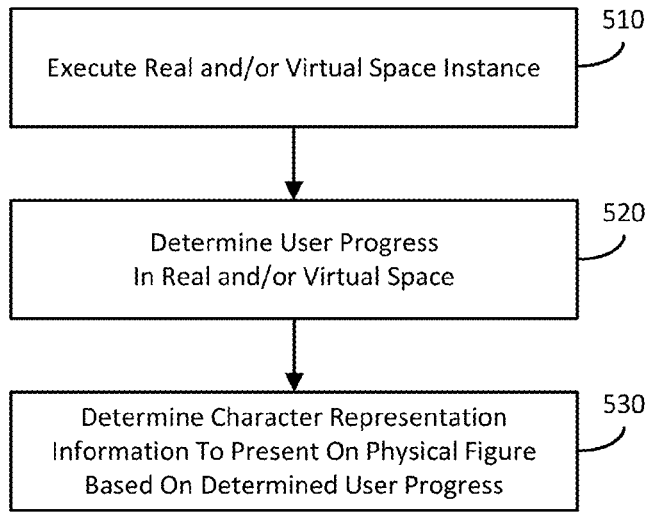
FIG. 5 illustrates an exemplary method to facilitate presenting user progress on a physical figure, according to one exemplary aspect.

According to one exemplary aspect, FIG. 5 illustrates an exemplary method 500 to facilitate presenting user progress on a physical figure. In general, the method 500 may begin at operation 510, where a virtual space instance may be executed and implemented to determine view information to transmit to one or more client computing platforms associated with a user and/or the physical figure associated with the user (e.g., via a wireless communication device implanted in the physical figure). In particular, the user may control one or more entities in the virtual space in order to participate in the virtual space. In addition, the instance executed at operation 510 may have one or more real-world aspects (e.g., real-world objectives that may facilitate advancement in the virtual space when achieved). Accordingly, in one exemplary use case, operation 510 may generally be performed using a space module having the same or similar characteristics to the space module 122 shown in FIG. 1, which was described in further detail above.

In one embodiment, at operation 520, user progress that relates to advancement in the virtual space and/or development in the real-world may be determined. For example, in the real-world context, the development may relate to social relationships, physical activities, emotional experiences, learning experiences, and/or other suitable real-world experiences. Furthermore, in one exemplary use case, operation 520 may generally be performed at a user module having the same or similar characteristics to the user module 124 shown in FIG. 1, which was described in further detail above.

In one embodiment, at operation 530, character representation information to present on the physical figure associated with the user may be determined based on the user progress that was determined in operation 520. For example, in one embodiment, the character representation information determined at operation 530 may include, without limitation, two-dimensional and/or three-dimensional graphical art, still images, movies, animations, audio, text, and/or other suitable information that may represent a character. Furthermore, the character representation information determined at block 530 may be presented on the physical figure, whereby the character representation information may include, without limitation, information relating to a physical appearance, verbal communications, character description, and/or other suitable character representation information that can be presented on the physical figure. Furthermore, in one exemplary use case, operation 530 may generally be performed at a character representation module having the same or similar characteristics to the character representation module 126 shown in FIG. 1, which was described in further detail above.

Figure 6:
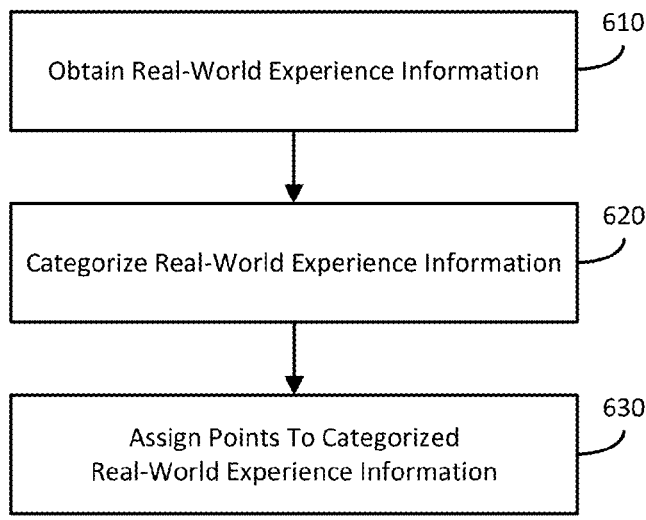
FIG. 6 illustrates an exemplary method to determine user progress in a virtual space based on real-world experiences or activities, according to one exemplary aspect.

According to one exemplary aspect, FIG. 6 illustrates an exemplary method to determine user progress in a virtual space based on real-world experiences or activities. In general, the method 600 may begin at operation 610, where real-world experience information associated with a particular user may be obtained, wherein the real-world experience obtained at operation 610 may include, without limitation, social experiences, physical activities, learning experiences, emotional experiences, and/or other suitable experiences that occur in the real-world. In one embodiment, at operation 620, the real-world experience information obtained at operation 610 may be categorized. For example, real-world social experiences may be classified in a "Connect" category, real-world experiences that relate to physical activities may be classified in a "Move" category, real-world experiences that relate to learning may be classified in a "Learn" category, and so on. In one embodiment, at operation 630, points may be assigned to the various real-world experiences that were obtained at operation 610 based on the categories that were assigned to the real-world experiences at block 620. For example, "Connect" points may be assigned to real-world social experiences, "Move" points may be assigned to physical activities that were performed in the real-world, and "Learn" points may be assigned to real-world experiences that resulted in user learning. Furthermore, in one exemplary use case, operations 610, 620, and 630 may generally be performed at a user module having the same or similar characteristics to the user module 124 shown in FIG. 1, which was described in further detail above.

Figure 7:
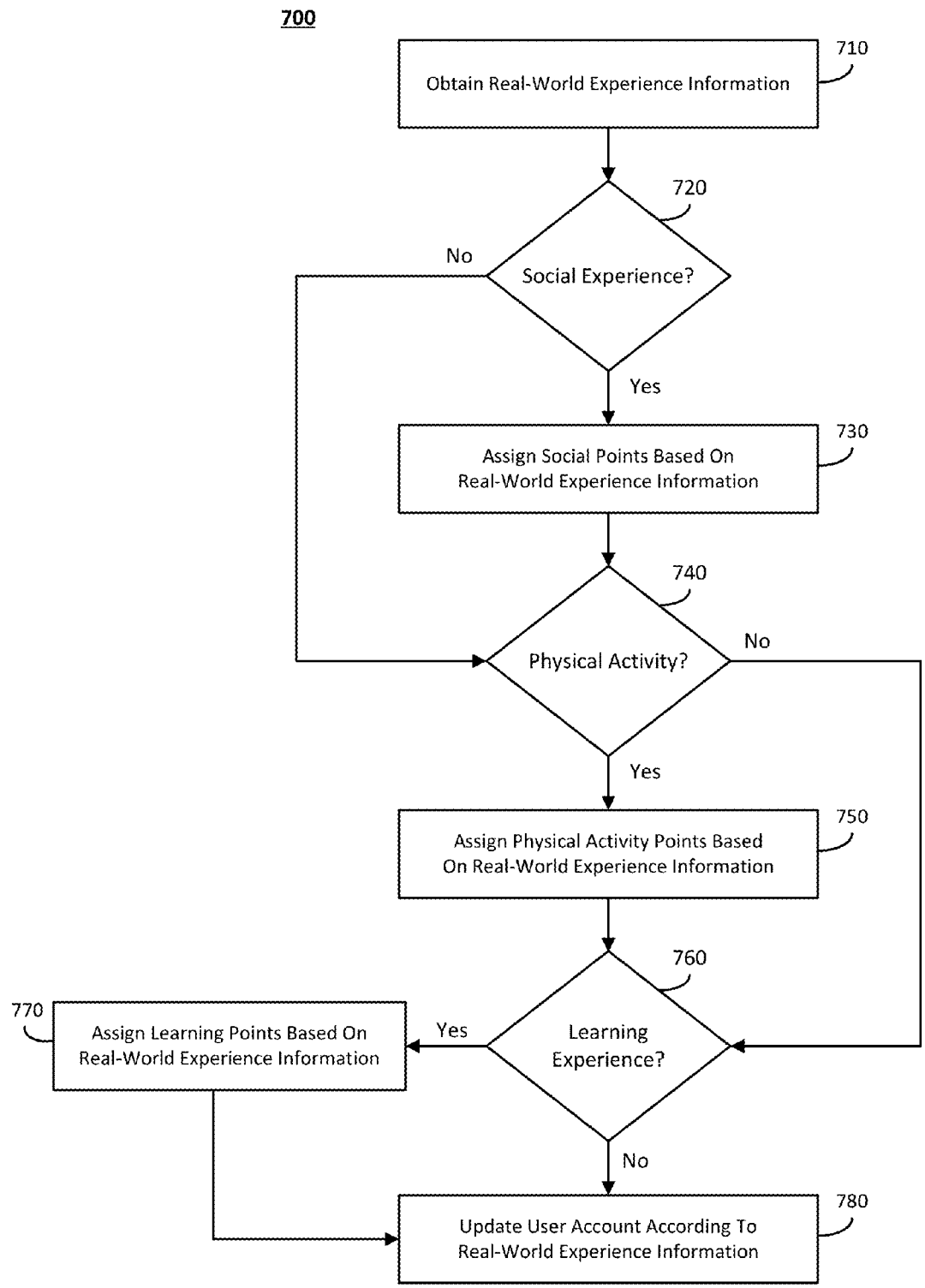
FIG. 7 illustrates another exemplary method to determine user progress in a virtual space based on real-world experiences or activities, according to one exemplary aspect.

According to one exemplary aspect, FIG. 7 illustrates another exemplary method 700 to determine user progress in a virtual space based on real-world experiences or activities, wherein the method 700 shown in FIG. 7 may generally provide more detail corresponding to the method 600 shown in FIG. 6, as described above. In particular, at operation 710, real-world experience information associated with a particular user may be obtained, wherein the obtained real-world experience may include social experiences, physical activities, learning experiences, emotional experiences, and/or other suitable experiences that occur in the real-world.

In one embodiment, a decision may be made at operation 720 with respect to whether the real-world experience information obtained at operation 710 relates to one or more social experiences, which may be the case where one or more other users reviewed the real-world experiences obtained in operation 710 and/or based on evidence that the experiencing user may have captured, wherein the evidence may comprise information that was captured with one or more wireless communication devices implanted in the physical figure. In particular, the one or more wireless communication devices may capture information that indicates proximity to one or more other physical figures having wireless communication capabilities and/or participation in competitive and/or cooperative activities that involved the other physical figure(s), which may indicate that the user interacted socially with the user(s) owning the other physical figure(s).

For example, in one use case, a user may be given an objective to meet three (3) new team members in person, which may be verified in response to the one or more wireless communication devices capturing evidence to verify that a user joined a location-based game or activity that involves three or more team members that the user has not previously met. More particularly, the wireless communication devices may detect that the user arrived at a location corresponding to a basketball court where three or more team members are further present, which may indicate participation in a known pick-up basketball game. In that case, the user may be assigned social points according to the participation in the basketball game and the meeting with the three or more team members, and the social points assigned to the user may be transmitted to a server to update the profile associated with the user. Furthermore, the information about the basketball game may be wirelessly transmitted to other members on the team associated with the user, who may then choose to join the game as well. In another exemplary use case, each member on a team may be assigned one or more items to find in a scavenger hunt and/or choose one or more items to find in the scavenger hunt, whereby as each team member finds appropriate items, announcements may be wirelessly transmitted to each team member. Furthermore, if a particular team member cannot locate one or more items, appropriate messages may be wirelessly transmitted to inform other team members that the one or more items are still outstanding and other team members may then search for the items until they are found. Accordingly, the wireless communication devices may facilitate alerting all team members when the scavenger hunt mission has been accomplished and/or how the team stands compared to other teams and appropriate social points may be assigned to individual team members and/or all team members based on their progress in the scavenger hunt mission and/or performance relative to other teams. In still another use case, the wireless communication device may be used in a location-based game called "sardines" in which one player may be designated the "sardine" and other players have to find the sardine. As such, as one or more players find the sardine, the players may be assigned social points and join the sardine until all participating players are huddled together, at which time the game may be considered complete and all participating players may receive further social points. In this example, the location associated with each player (e.g., GPS coordinates) may be wirelessly transmitted among the participating players in order to give the players the necessary information to find the other players and thereby complete the game.

Accordingly, in response to operation 720 resulting in a determination that the real-world experience information obtained at operation 710 relates to one or more real-world social experiences, social points may be assigned to the user in the virtual space at operation 730. Otherwise, in response to determining that the real-world experience information obtained at operation 710 does not relate to any real-world social experiences, no social points may be assigned with respect to those real-world experiences.

In one embodiment, a decision may then be made at operation 740 with respect to whether the real-world experience information relates to one or more physical activities, which may depend on whether one or more internal sensors on the physical figure and/or one or more external sensors in communication with the physical figure captured evidence indicating that the user engaged in certain physical activities. For example, the sensors may include an accelerometer, gyroscope, or other suitable sensors that can measure movement and detect physical activities according to the movement measurements (e.g., running, walking, riding a bicycle, etc.) and thereby capture evidence relating to one or more physical activities that may result in physical activity points assigned to the user.

For example, in the basketball use case mentioned above, the user may be further assigned physical activity points according to the participation in the basketball game in addition to any social points that may be assigned based on the social aspects associated with the basketball game. In another exemplary use case, teams may participate in a relay race where each team member runs a lap or performs another suitable physical task in sequence and the wireless communication devices exchange the necessary information to inform each user when their turn begins or is about to begin (e.g., in response to the other team members completing their turn and the wireless communication devices associated with the other users signaling that the turn has completed). Alternatively, the teams could perform the physical task simultaneously and performance information could be transmitted wirelessly in a generally similar manner. In still another exemplary use case, users may participate in a jumping jacks or other exercise competition, wherein players may be tasked with performing as many jumping jacks as they can in a particular time period (e.g., thirty seconds), the internal and/or external sensors may measure how many jumping jacks each user performs in the designated time period, and the wireless communication devices may transmit and/or receive information that indicates how each user placed in the competition. Furthermore, as noted above, the physical figures associated with one or more users may include a media capture unit, which may be used to capture video or other media corresponding to the user actions, which may be processed to analyze and verify the results (e.g., through motion capture technology), and the wireless communication devices may then wirelessly send the results and/or the media corresponding to the winning user to other users (e.g., other team members, non-team members, etc.).

Accordingly, in response to determining that the real-world experience information relates to one or more physical activities at operation 740, the user may be assigned physical activity points in the virtual space at operation 750. Otherwise, in response to determining that the real-world experience information does not relate to any real-world physical activities, no physical activity points may be assigned with respect to those real-world experiences.

In one embodiment, a decision may then be made at operation 760 with respect to whether the real-world experience information relates to one or more learning experiences, which may be further determined using the wireless communication devices, sensors, or other suitable components associated with the physical figure. For example, in one embodiment, the wireless communication devices implanted in the physical figure may compute location information indicating that the user brought the physical figure to a museum or other real-world place where educational or other learning opportunities are available. In another example, the user may be assigned an objective that involves experimentation with motion to learn about the laws of physics, in which case movement captured with the sensors implanted in the physical figures may capture evidence to confirm that the user engaged in the experiments and therefore likely learned something about physics. In other exemplary use cases, users may be assigned learning missions and the wireless communication devices may wirelessly communicate with a server and/or other team members to determine when the learning task has been completed, how each team member performed on the learning task, and/or how each team performed on the learning task compared with other teams. For example, one learning mission may involve identifying ten wild plants, birds, trees, cars, flowers, bugs, etc. in a neighborhood. In another example, a learning mission may include identifying various ways that a neighborhood could be improved (e.g., according to resource usage, energy consumption, cleanliness, aesthetics, etc.), wherein the wireless communication devices may wirelessly connect to a database that stores known neighborhood problems organized according to priority and/or according to missions that users may be tasked with solving (e.g., picking up trash in the park, making a mural on an ugly building, helping an elderly person in need, etc.). In another example, a learning mission may include finding a building in a neighborhood that meets certain criteria (e.g., the oldest, tallest, or newest building in the neighborhood), whereby in response to one team member finding a building built in 1890, that information may be wirelessly communicated to other team members who then have to try to find an older building within a certain time period. In still another example, a learning mission may include meeting at the highest point in a neighborhood without climbing on any objects, wherein information indicating the highest point that any team member has reached may be wirelessly transmitted to the other team members, who can either follow that person or try to find a higher point on their own and whoever reaches the highest point after a certain time period wins.

Accordingly, in response to operation 760 resulting in a determination that the real-world experience information relates to one or more learning experiences, the user may be assigned learning points in the virtual space at operation 770. Otherwise, in response to determining that the real-world experience information does not relate to any real-world learning experiences, no learning points may be assigned with respect thereto.

In one embodiment, in response to suitably processing the real-world experience information and appropriately assigning social points, physical activity points, and/or learning points to the user, the account associated with the user may be updated at operation 780. For example, to motivate, encourage, and/or recognize user achievements in the real-world, updating the user account at operation 780 may include granting one or more rewards to the user that facilitate progress within the virtual space (e.g., unlocking one or more items, improving one or more abilities, acquiring one or more new skills, awarding virtual currencies, etc.). As such, the user account may be updated at operation 780 to give the rewarded user new abilities and/or actions that can be used in further real-world experiences and/or activities that may occur in the virtual space. For example, the rewards may be ascetic and decorative awards such as medals, badges, body armor, outfits, tattoos, shoulder pads, shoes, and/or any other accessories given to the user that can then be presented on the physical figure to recognize achievements based on the real-world experiences. Furthermore, those skilled in the art will appreciate that the evidence that the wireless communication devices capture may involve more than one category and/or additional categories other than those mentioned above. For example, in one use case, missions that require a certain skill (e.g., cooking) or particular training could be offered at specific location, wherein administrations may send the location and description associated with the missions to users through the server and attendance could be verified using Bluetooth or another suitable short-range wireless connection. In addition, users could sign in and out using the wireless communication devices in order to verify presence and participation in the entire "session" that corresponds to the particular mission, and the physical figure or other character associated with the user may then receive a digital reward (e.g., points or badges for attending the session). In another exemplary use case, a mission may include school projects that can be broken down into pieces to teach collaboration, wherein the project pieces can be assigned as team missions that are assigned to various students (e.g., a construction or art project to gather materials for an eagle nest or collage, where each team member may be tasked with gathering a different piece or material to use in the nest or collage). In still another example, a mission may be defined according to a contained environment such as a zoo, where the first person (or team) to visit all flightless birds, primates, rodents, etc. and take a picture to confirm the same may win, and the information associated with the winning person (or team) may be wirelessly transmitted to other team members participating in the game.

Figure 8:
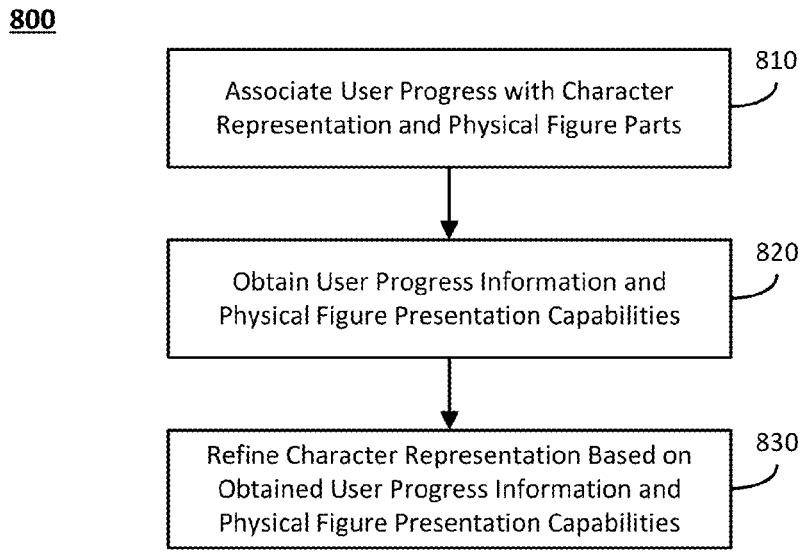
FIG. 8 illustrates an exemplary method to determine character representations based on user progress in real and/or virtual spaces, according to one exemplary aspect.

According to one exemplary aspect, FIG. 8 illustrates an exemplary method 800 to determine character representations based on user progress in real and/or virtual spaces, wherein the method 800 may initially form one or more associations between user progress in the real and/or virtual space, character representations associated with the user, and parts on a physical figure associated with the user at operation 810. For example, in one embodiment, a user progress table may specify the associations according to pre-created character representation information and specific user progresses and a character representation table may specify relationships between the character representation information and user achievements that relate to real-world social experiences that can be presented on a torso piece associated with the physical figure, real-world physical activities that can be presented on arm pieces associated with the physical figure, and real-world learning experiences that can be presented on leg pieces associated with the physical figure.

In one embodiment, at operation 820, user progress that relates to advancements in the virtual space and/or development in the real-world may be obtained, wherein the real-world development may occur in areas that include, without limitation, social relationships, physical activities, emotional experiences, and/or learning experiences through real-world activities. Furthermore, at operation 820, specific character representation information may be determined based on the user progress and presentation capabilities associated with the physical figure may be further obtained. For example, the physical figure presentation capabilities may indicate display screens that are attached to, included in, or otherwise coupled to the physical figure in addition to locations associated with the display screens relative to the physical figure, resolutions, frequencies, sizes, shapes, and/or other presentation aspects associated with the individual display screens, and/or any other information that may be relevant to the various capabilities that the physical figure has to present the character representation information.

In one embodiment, at operation 830, the character representation to present on the physical figure may be further refined based on the presentation capabilities information that were obtained in operation 820. For example, in one embodiment, resolutions, sizes, color schemes, sound qualities (e.g., 48 bit mono, 96 bit stereo, etc.), and/or other suitable properties associated with the character representation information may be refined at operation 830 according to the presentation capabilities associated with the physical figure.

Figure 9:
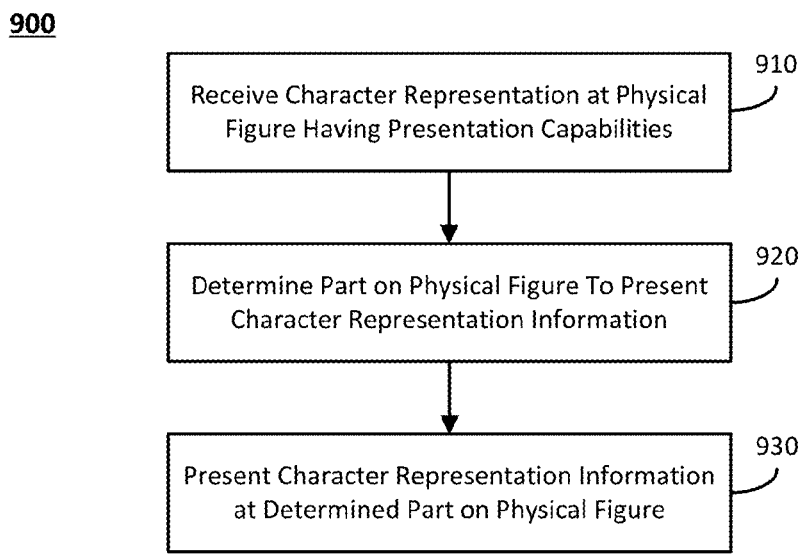
FIG. 9 illustrates an exemplary method to present character representations on a physical figure, according to one exemplary aspect.

According to one exemplary aspect, FIG. 9 illustrates an exemplary method 900 to present character representations on a physical figure, wherein the method 900 may include an operation 910 where a character representation that represents user progress in the real-world and/or user progress in a virtual space may be received at a physical figure. In one embodiment, a location on the physical figure that should be used to present the character representation information may then be determined at block 920. For example, in one embodiment, operation 920 may determine that character representation information representing user achievements in social real-world experiences may be presented on a torso piece associated with the physical figure, character representation information representing user achievements in real-world physical activities are to be presented on arm pieces associated with the physical figure, and character representation information representing user achievements in real-world learning experiences are to be presented on leg pieces associated with the physical figure. In one embodiment, at operation 930, the character representation information may then be appropriately presented on the physical figure at the appropriate parts, as determined in operation 920.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium.

Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A physical figure belonging to a user, comprising:
    a torso piece having at least a head, arms, and legs connected thereto;
    a wireless communication device configured to capture evidence confirming that the user has performed a real-world activity that includes at least a wireless communication with a second physical figure, belonging to a second user, having wireless communication capabilities based on the wireless communication with the second physical figure confirming proximity between the user and the second physical figure, the real-world activity representing an advancement towards one or more objectives provided in a virtual space, wherein the one or more objectives include a requirement that the physical figure be used to perform the real-world activity that includes at least the wireless communication with the second physical figure indicating that the user physically advanced the physical figure toward a location where the second physical figure is located; and
    a processing unit configured to transmit the captured evidence to a computing platform configured to determine progress that the user has made towards achieving the one or more objectives provided in the virtual space based at least in part on the evidence captured with the wireless communication device;
    wherein the real-world activity comprises one or more of a cooperative activity or a competitive activities that requires wireless interaction with the second physical figure;
    wherein the wireless communication device comprises a location data receiver configured to determine a location associated with the physical figure, and wherein the captured evidence confirms that the user performed the real-world activity based on the determined location being proximate to the location where the second physical figure is located.

2. The physical figure recited in claim 1, further comprising:
    one or more sensors configured to measure motion that further confirms that the user has performed the real-world activity.

3. The physical figure recited in claim 1, wherein the wireless communication device is further configured to detect the second physical figure in proximity thereto via the wireless communication, and wherein the processing unit is further configured to generate the one or more objectives that include the requirement that the physical figure be used to perform the real-world activity in response to a determination that the second physical figure previously was used to perform the real-world activity.

4. The physical figure recited in claim 1, wherein the processing unit is further configured to receive character representation information that indicates the progress that the user has made towards achieving the one or more objectives provided in the virtual space.

5. The physical figure recited in claim 4, further comprising:
    one or more display screens configured to display the character representation information that indicates the progress that the user has made towards achieving the one or more objectives provided in the virtual space.

6. The physical figure recited in claim 1, wherein the processing unit is configured to transmit the captured evidence to the computing platform over a wireless link using the wireless communication device.

7. The physical figure recited in claim 1, wherein the real-world activity comprises one or more of a social experience, a physical activity, or a learning experience.

8. A method for capturing evidence that relates to real-world activities, comprising:
    establishing a wireless connection at a physical figure, belonging to a user, having a torso piece and at least a head, arms, and legs connected to the torso piece;
    monitoring the wireless connection to capture evidence confirming that the user has performed a real-world activity using the physical figure based on the wireless connection confirming a proximity between the user and a second physical figure belonging to a second user, the real-world activity representing an advancement towards one or more objectives provided in a virtual space, wherein the one or more objectives include a requirement that the physical figure be used to perform the real-world activity that includes at least a wireless communication with the second physical figure indicating that the user physically advanced the physical figure toward a location where the second physical figure is located;
    wherein the real-world activity comprises one or more of a cooperative activity or a competitive activities that requires wireless interaction with the second physical figure;
    wherein the wireless communication device comprises a location data receiver configured to determine a location associated with the physical figure, and wherein the captured evidence confirms that the user performed the real-world activity based on the determined location being proximate to the location where the second physical figure is located; and transmitting the captured evidence to a computing platform configured to determine progress that the user has made towards achieving the one or more objectives provided in the virtual space based at least in part on the evidence captured over the monitored wireless connection.

9. The method recited in claim 8, further comprising:

obtaining one or more motion measurements confirming that the user has performed the real-world activity using one or more internal sensors implanted in the physical figure or one or more external sensors that communicate with the physical figure over the wireless connection.

10. The method recited in claim 8, further comprising:

detecting the second physical figure via the wireless connection; and generating the one or more objectives that include the requirement that the physical figure be used to perform the real-world activity in response to a determination that the second physical figure previously was used to perform the real-world activity.

11. The method recited in claim 8, further comprising:

receiving character representation information that indicates the progress that the user has made towards achieving the one or more objectives provided in the virtual space.

12. The method recited in claim 11, further comprising:

displaying the character representation information that indicates the progress that the user has made towards achieving the one or more objectives provided in the virtual space on one or more display screens located on the physical figure.

13. The method recited in claim 8, wherein the captured evidence is transmitted to the computing platform over the wireless connection.

14. The method recited in claim 8, wherein the real-world activity comprises one or more of a social experience, a physical activity, or a learning experience.

15. A non-transitory computer-readable storage medium having computer-executable instructions recorded thereon, the computer-executable instructions configured to cause a first physical figure, belonging to a user, having at least one processor to:

capture, via a wireless communication device, evidence confirming that the user has performed a real-world activity that includes at least a wireless communication with a second physical figure, belonging to a second user, having wireless communication capabilities, wherein the wireless communication with the second physical figure confirms proximity between the user and the second physical figure, the real-world activity representing an advancement towards one or more objectives provided in a virtual space, wherein the one or more objectives include a requirement that the physical figure be used to perform the real-world activity that includes at least the wireless communication with the second physical figure indicating that the user physically advanced the physical figure toward a location where the second physical figure is located;

wherein the real-world activity comprises one or more of a cooperative activity or a competitive activities that requires wireless interaction with the second physical figure;

wherein the wireless communication device comprises a location data receiver configured to determine a location associated with the physical figure, and wherein the captured evidence confirms that the user performed the real-world activity based on the determined location being proximate to the location where the second physical figure is located; and transmit the captured evidence to a computing platform configured to determine progress that the user has made towards achieving the one or more objectives provided in the virtual space based at least in part on the evidence captured with the wireless communication device.

\* \* \* \* \*